(12) United States Patent
Barnes

(10) Patent No.: US 7,413,393 B1
(45) Date of Patent: Aug. 19, 2008

(54) METHOD FOR LOADING AND UNLOADING SUBSTRUCTURES FOR A MOBILE DRILLING RIG

(76) Inventor: R. Michael Barnes, 3303 FM 1960 West, Suite 230, Houston, TX (US) 77068

( * ) Notice: Subject to any disclaimer, the term of this patent is extended or adjusted under 35 U.S.C. 154(b) by 326 days.

(21) Appl. No.: 11/069,784

(22) Filed: Mar. 1, 2005

(51) Int. Cl.
*B60P 3/022* (2006.01)

(52) U.S. Cl. .................. 414/373; 414/435; 280/404

(58) Field of Classification Search ............ 414/22.51, 414/22.54, 22.56, 22.62, 22.67, 10, 332, 414/919, 435, 461, 809; 280/404, 405.1; 173/28; 298/8 R
See application file for complete search history.

(56) References Cited

U.S. PATENT DOCUMENTS

| | | | | |
|---|---|---|---|---|
| 2,767,870 | A * | 10/1956 | Gove | 414/435 |
| 3,019,927 | A * | 2/1962 | Sheehan, Jr. et al. | 414/461 |
| 3,645,559 | A * | 2/1972 | Stafford, Jr. | 280/418.1 |
| 3,922,825 | A * | 12/1975 | Eddy et al. | 52/116 |
| 4,899,832 | A * | 2/1990 | Bierscheid, Jr. | 173/187 |
| 6,821,066 | B2 * | 11/2004 | Wehrli | 410/32 |
| 6,860,337 | B1 * | 3/2005 | Orr et al. | 173/28 |
| 6,994,171 | B2 * | 2/2006 | Orr et al. | 173/28 |
| 7,112,029 | B1 * | 9/2006 | Neatherlin | 414/458 |
| 2004/0211598 | A1 * | 10/2004 | Palidis | 175/162 |
| 2005/0194189 | A1 * | 9/2005 | Barnes | 175/122 |

* cited by examiner

*Primary Examiner*—Saul J. Rodriguez
*Assistant Examiner*—Charles N Greenhut
(74) *Attorney, Agent, or Firm*—Buskop Law Group, PC; Wendy Buskop

(57) ABSTRACT

A method for unloading a drilling rig substructure at a drilling site entails transporting the substructure to the drilling site using a truck and a dolly. The substructure is lowered onto the dolly rollers. The dolly is secured and the truck moves towards the dolly pushing the substructure along the rollers. The gooseneck is disconnected from the substructure and connected to the dolly. A first wireline is connected from a first winch to the substructure and a second wireline is connected from the second winch to the substructure through the sheave block. The second winch pulls the substructure along the rollers and is disconnected once the substructure contacts the site. The dolly is unsecured and the truck moves in an opposite direction from the rig, thereby allowing the substructure to move along rollers onto the site. A method for loading a drilling rig substructure onto a truck and a dolly is also described herein.

24 Claims, 24 Drawing Sheets

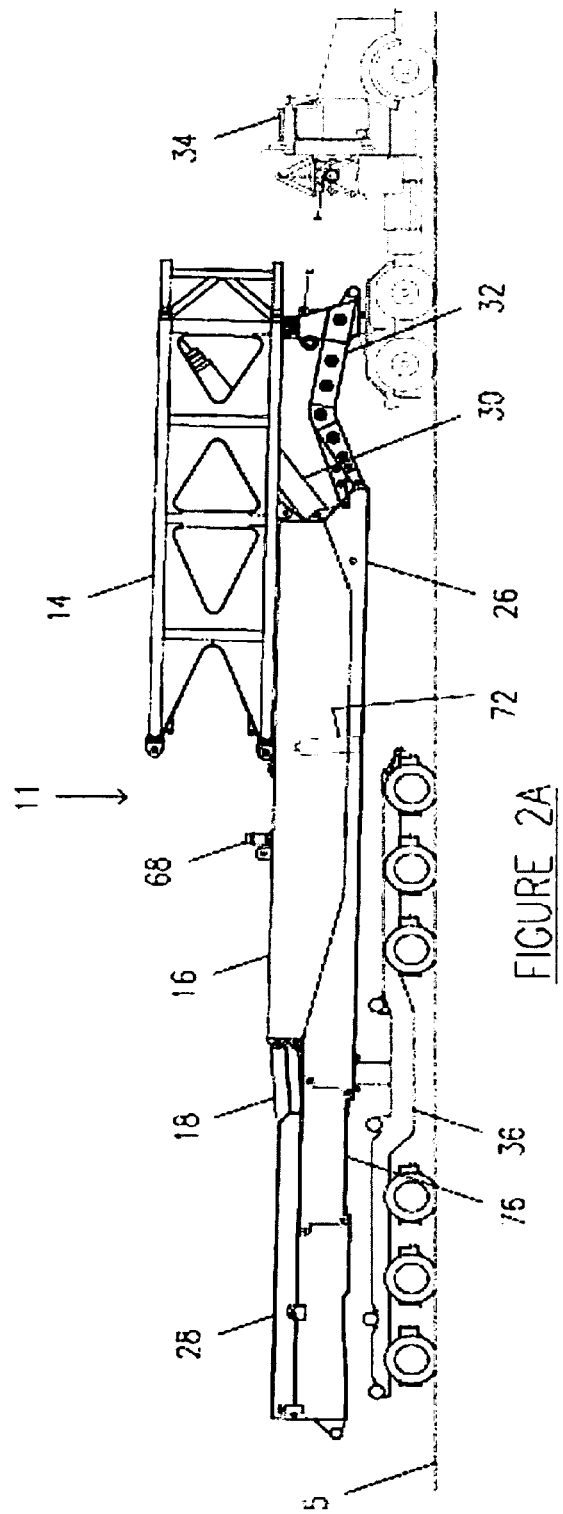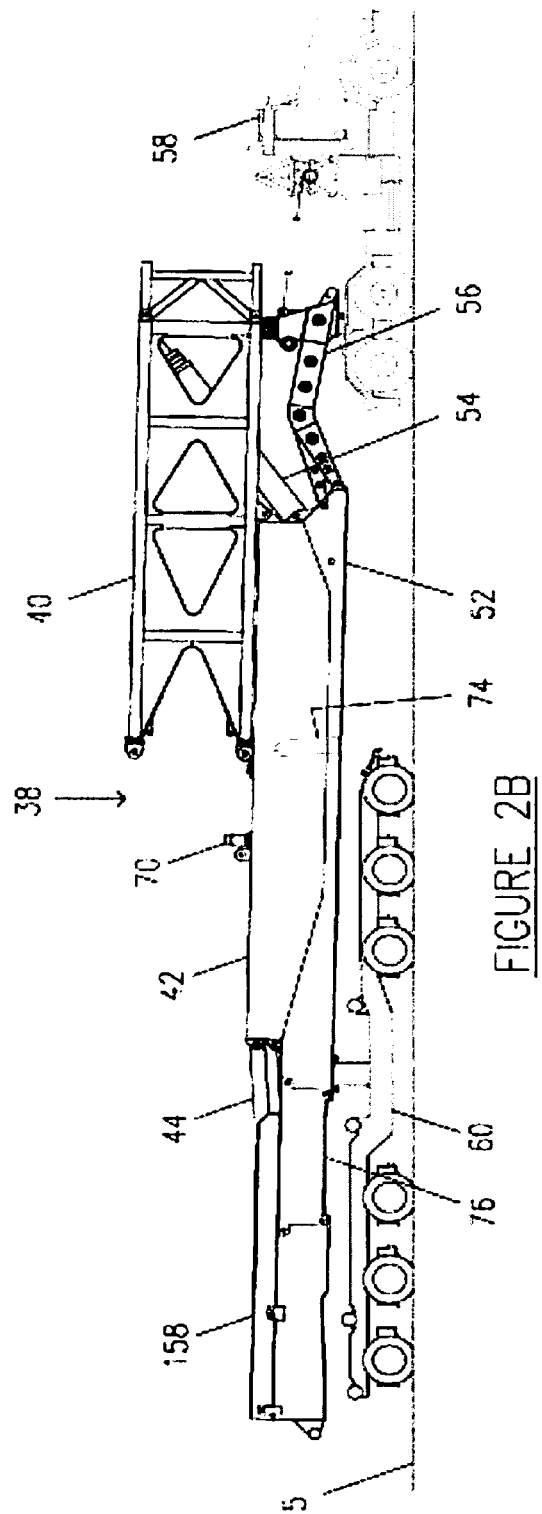
FIGURE 2A
FIGURE 2B

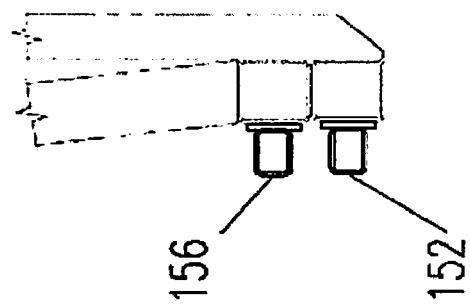
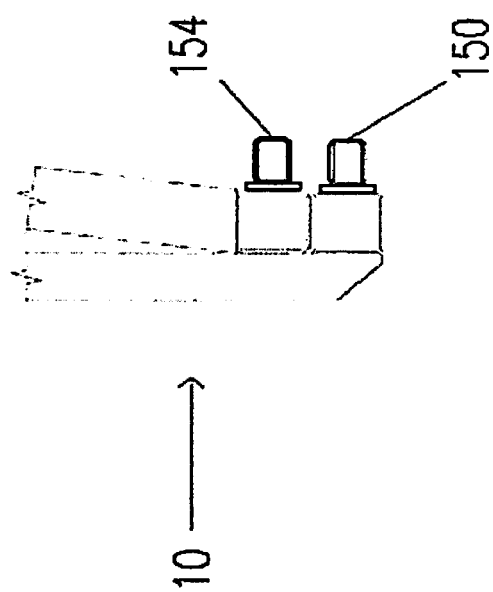
FIGURE 15

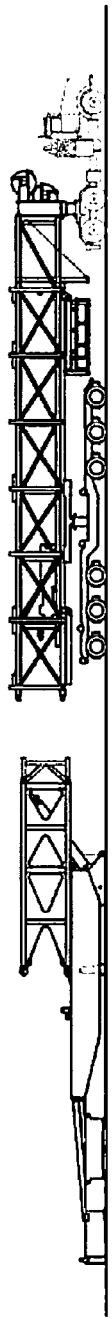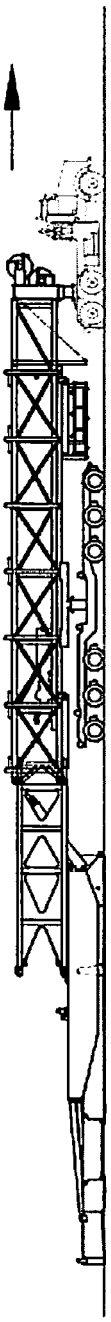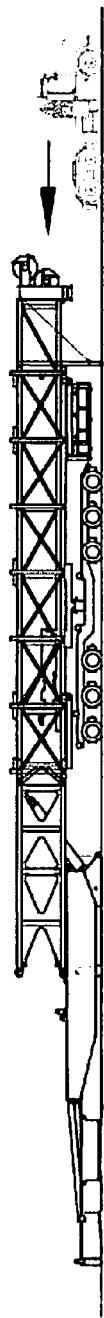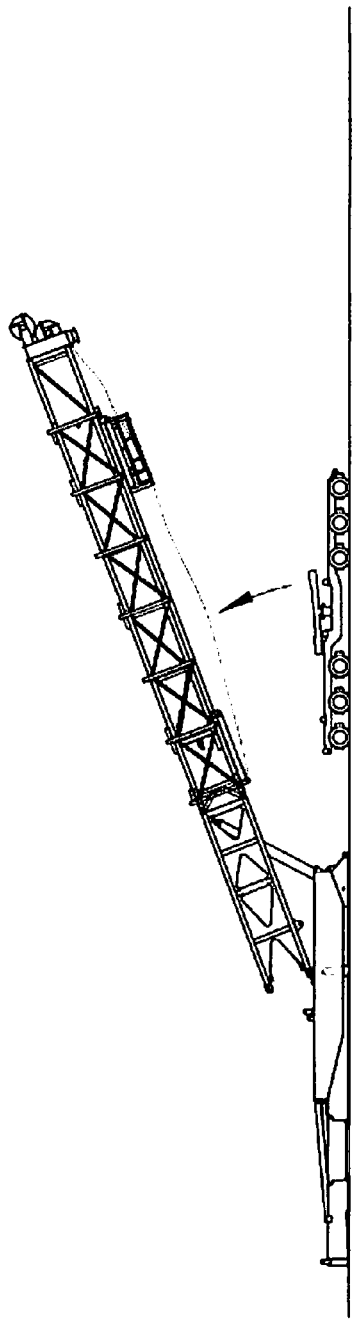

METHOD FOR LOADING AND UNLOADING SUBSTRUCTURES FOR A MOBILE DRILLING RIG

FIELD

This application is related to co-pending U.S. patent application Ser. No. 11/069,783 filed Mar. 1, 2005, and to co-Pending U.S. patent application Ser. No. 11/069,787 filed Mar. 1, 2005. The present embodiments relate to methods of loading and unloading mobile drilling rig substructure at a drilling site using a truck and a self-steering dolly.

BACKGROUND

In the current art, drilling rigs or workover rigs with a hook capacity between 450 kips and 500 kips represent the upper limit for rigs with a mast and drawworks package that can be transported on a single trailer within legal or permit able road transportation limitations. Above this capacity, single trailer packaging is not achievable with a full-height mast with traveling equipment and a top drive pre-strung with wireline without grossly exceeding practical road weight limitations.

Although single trailer packaging of a mast is expected for smaller capacity operations for efficient mobilization, this upper limit capacity with the single trailer packaging presents compromises to design that distinguish the limited rig from a "full blown drilling rig". Adherence to this type of packaging results in limitations of drawworks design, of working space on the floor, of mast flexibility, of mast durability, of mast stability, of floor height, of BOP height, and of allowable accessories. Extensive use of high-strength steel and extremely light design for components make the structural integrity inherently more critical or prone to and sensitive to damage that inevitably occurs in normal operations. Commonly, the mast or other components are removed and separately transported for legal road transport in many regions.

Many of the current single trailer or carrier rig designs treat the substructure somewhat as an afterthought. The packaging of the substructure for road transport, assembly, and erection is rarely given adequate attention.

In a fully capable, modern drilling package with a mud system with tanks, engine power and control modules, well control equipment, as well as other significant packages to complete, the mast and substructure represent only a portion of the total. Overall efficient packaging of the entire rig does not end with the mast and substructure.

One of the most notable deficiencies in mobile or "fast moving" rig packaging is the inability to move efficiently between wells a short distance apart. This major shortcoming is critical in some drilling operations that have wells in a cluster or single row. In these installations, the operator needs a rig to move very quickly (a few hours or less) between wells that are typically thirty meters or less apart from each other.

Most rig substructures are configured so that the rig must be completely rigged down to make these short moves. Other substructures have openings that allow skidding without rigging down, but have the disadvantage that the mast must be installed and laid down along the direction of the well row. This configuration is not acceptable because of the danger of the mast falling on a completed wellhead.

Current methods for modifying existing drilling rigs to allow them to move efficiently from well-to-well are very costly. The single trailer packaging does not lend itself to efficient well-to-well moves. The current art does not teach of any mobile or "fast moving" rigs that adequately address short well-to-well moves.

Some rig packages compromise on the mast height. Limitations to doubles or singles compromise on tripping efficiency and are not acceptable to many operators if a treble mast is available as an alternative.

A need, therefore, exists for a drilling rig that does not go beyond legal transportation limits, but also provides efficient installation and assembly, minimum rig up site requirement, scalability of rig capacity, mobility, well-to-well skidding, and winterization possibilities not found in the current art.

BRIEF DESCRIPTION OF THE DRAWINGS

In the detailed description of the embodiments presented below, reference is made to the accompanying drawings, in which:

FIG. 2A depicts a side view of an embodiment of a driller's side substructure transported on a truck and a multiple axle dolly.

FIG. 2B depicts a side view of an embodiment of an off-driller's side substructure transported on a truck and a multiple axle dolly.

FIG. 15 depicts a cross sectional detail view of the top drive guide rails showing the relationship of the upper section guide rails and the lower section guide rails.

FIG. 20a depicts a side view of a step in the method of connecting a mast to the substructure and raising the mast in a vertical orientation.

FIG. 20b depicts a side view of a step in the method of connecting a mast to the substructure and raising the mast in a vertical orientation.

FIG. 20c depicts a side view of a step in the method of connecting a mast to the substructure and raising the mast in a vertical orientation.

FIG. 20d depicts a side view of a step in the method of connecting a mast to the substructure and raising the mast in a vertical orientation.

Figure 1:
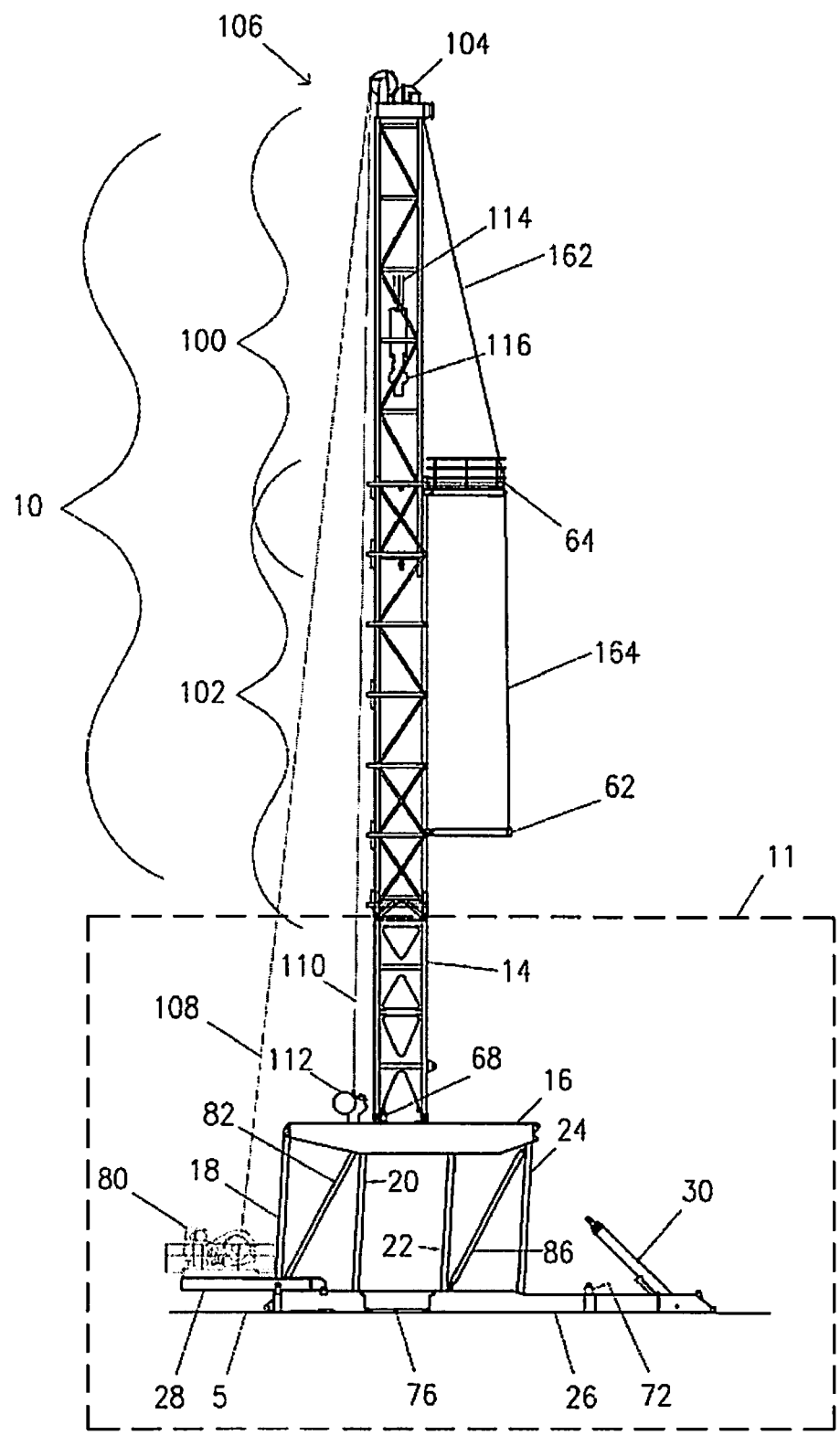
FIG. 1 depicts a driller's side view of an embodiment of a mobile drilling rig fully erected at a drilling site.

The present embodiments are detailed below with reference to the listed Figures.

DETAILED DESCRIPTION OF THE EMBODIMENTS

Before explaining the present embodiments in detail, it is to be understood that the embodiments are not limited to the particular descriptions and that it can be practiced or carried out in various ways.

Before explaining the present embodiments in detail, it is to be understood that the embodiments are not limited to the particular descriptions and that it can be practiced or carried out in various ways.

The present embodiments relate to a mobile drilling or workover rig. The mobile drilling rig is an efficient assembly of equipment that allows the rig to be transported and installed easily and quickly. The embodied mobile drilling rigs include a unique substructure design that allows well-to-well access along a row of multiple wells. The substructure allows existing wellheads to be cleared since the subbase center section is removable leaving a large clear opening. Further, since the mast assembly can install and raise perpendicular to the row of wells, the embodied mobile drilling rigs can safely clear the existing wellheads.

The embodied mobile drilling rigs can be configured to be transported by road with as little as three major loads, all within legal or permitable load and dimensional limits for most regions. Assembly of the rig is accomplished without cranes or special equipment and requires minimal time and man hours and is safer in comparison with the assembly of rigs in the known art. The single-load mast transportation reduces rig-up complexity. The integration of braces with the transported loads eliminates the need to handle loose components and minimizes field connections.

The embodied mobile drilling rigs are capable of being equipped with modern equipment including AC power, top drive, driller's control cabin, and other similar pieces of equipment needed in drilling operations. The embodied mobile drilling rigs provide a reduced pad size requirement and improve cellar access for BOP handling.

The methods for installing a mobile drilling rig at a drilling site provide a minimal rig-up sequence that is fast, efficient, safer, and does not require a crane or special equipment. The embodied mobile drilling rigs have a low assembly height, around five feet in most cases, which allow loads to be off-loaded from the truck and dolly without the need for intermediate handling. The mast and drawworks installations are not sequence dependent allowing for better hook-up time. The doghouse and driller's cabin can be raised with the drill floor. The methods include utilizing the same telescopic cylinders for raising the mast and substructure, thereby reducing manual intervention during transportation, rig-up, erection, or dismantling.

An embodiment of a mobile drilling rig includes a mast section, a driller's side substructure, and an off-driller's side substructure. All three sections are mobile and meet legal load and dimensional limits for road transportation in most regions.

The mast section can include an upper section that nest within and a lower section in a telescoping fashion. Each substructure includes a mast starting section and a floor side box connected to the mast starting section. Each substructure includes one or more elevating legs that engage the floor side box and a subbase side box. Each substructure section includes a subbase side box and one or more raising cylinders that are connected to the subbase side box and mast starting section. The lower end of the mast starting section engages the mast starting sections.

The methods entail transporting the mobile drilling rig to the drilling site. The mobile drilling rig is transported in three sections: a mast section; a driller's section; and an off-driller's section. The driller's and off-driller's sections each include a substructure, a mast starting section located on the substructure, and raising cylinders connected to the substructure and the mast starting section. The mast and substructure can be installed together at the same time as the generators and other rig equipment because the installation activity for the mast and substructure occurs primarily in the area forward of the well, while the installation activity of the other rig equipment occurs primarily in the area in the rear of the well.

The driller's and off-driller's sections are positioned parallel to one another at the drilling site. The mast is positioned to the mast starting section. The mast and mast starting sections are raised into a vertical orientation using the raising cylinders on each of the substructures.

The method continues by raising the drill floor on each section to an intermediate height using the intermediate raising cylinders disposed in each separate section. The raising cylinders are retracted from the mast raising position on the mast starting section and engaged in the drill floor raising position. The drill floors are raised using the raising cylinders. Braces connecting the drill floor to the subbase are then locked in place.

Figure 4:
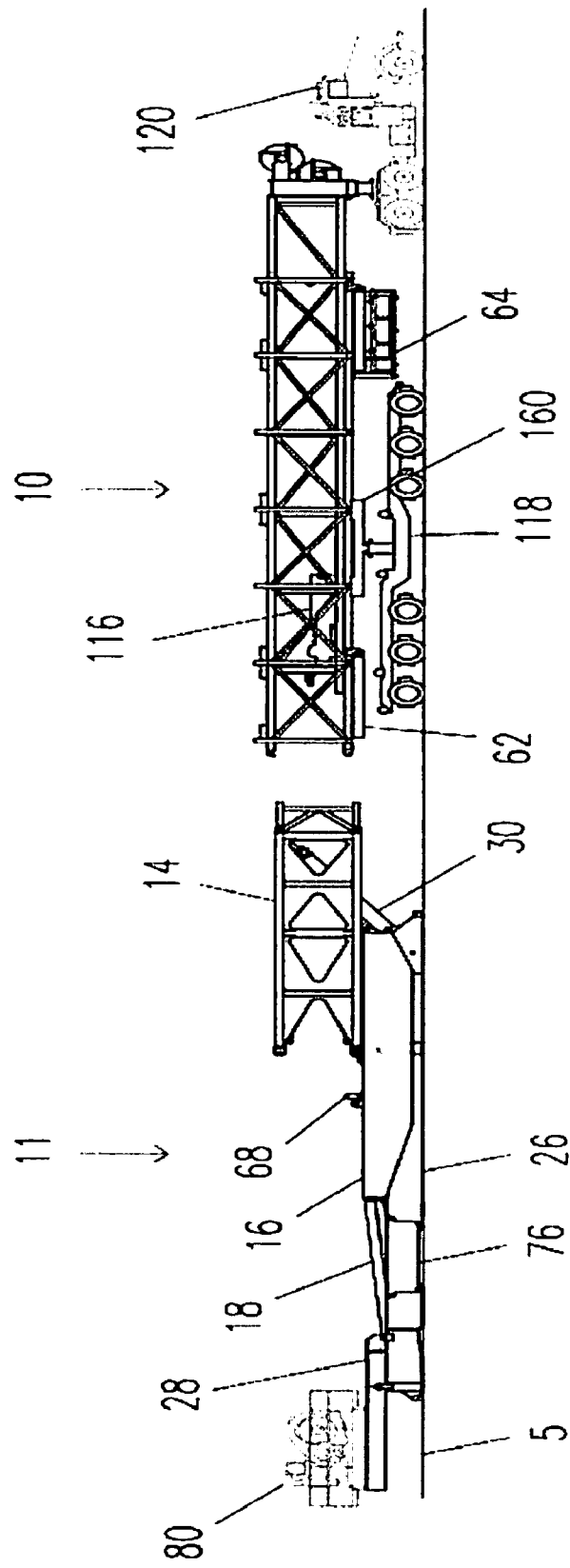
FIG. 4 depicts a side view of the driller's side substructure after offloading and a mast transported on a multiple axle dolly and prepared for engagement with the mast starting sections.

With reference to the figures, FIG. 1 depicts a driller's side view of an embodiment of a mobile drilling rig fully erected at a drilling site (5). FIG. 1 shows the mast (10) fully erected with a belly board (62) and racking board (64). The mast includes an upper section (100) that can nest within the lower section (102) when retracted, as depicted in FIG. 4.

A mobile drilling rig can include a hoisting assembly that includes drawworks (80), fastline (108), a crown (104), drill lines (114), deadline (110) and a deadline anchor (112). The drawworks can rest on a driller's drawworks support frame (28). The off-driller's support structure can include a drawworks support frame as well. FIG. 1 shows the fast line (108) extended from the drawworks (80) to the crown (104). A deadline (110) can extend from the crown (104) to the deadline anchor (112), which can be located on the floor side box. FIG. 1 shows the traveling block (116) suspended from the crown (104) by the drill lines (114). The embodied drilling rig can include braces connected to the driller's elevating legs and/or the subbase side box and the floor side box. FIG. 1 depicts the driller's braces (82 and 86) connected to a driller's floor side box (16) and a driller's subbase side box. The off-driller's braces are not shown in the side view of FIG. 1. The driller's and off-driller's brace can be telescoping braces.

A mobile drilling rig is transported to the site (5) in at least three sections: a driller's side substructure (11), an off-driller's side substructure (38), and a mast (10). The three sections are depicted in FIG. 2A, FIG. 2B, FIG. 3, and FIG. 4. The three sections are transported to the site (5) using normal transportation means, such as a truck or trucks and dollies.

FIG. 2A depicts a driller's side substructure (11) and mast starting section transported on a first truck (34) and a first multiple axle dolly (36). A driller's side substructure (11) includes a first mast starting section (14) and a driller's floor side box (16) that is connected to the first mast starting section (14). A driller's side substructure (11) includes two or more driller's elevating legs that engage the driller's floor side box (16). Only one driller's elevating leg (18) is visible in FIG. 2A from the side view. A driller's subbase side box (26) engages the driller's elevating legs (18). A driller's side substructure (11) includes a driller's raising cylinder (30) that is connected to the driller's subbase side box (26) and the first mast starting section (14). The first truck and second truck can be the same truck. One substructure can be delivered to the drilling site and the same truck can be used to transport the other substructure in a second transport trip.

As depicted in FIG. 2A, the first truck (34) can connect to a driller's gooseneck (32), which is connected to the driller's subbase side box (26). The first mast starting section (14) rests on the driller's gooseneck (32). The first multiple axle dolly (36) engages the driller's subbase side box (26) and supports the driller's side substructure (11).

FIG. 2A further shows the location of the driller's snubbing cylinder (68) located on the driller's floor side box (16). The driller's intermediate cylinder (72) is shown on the driller's subbase side box (26) in order to initiate raising the driller's floor side box (16).

FIG. 2B depicts an off-driller's side substructure (38) and mast starting section transported on a second truck (58) and a second multiple axle dolly (60). In the simplest form, an off-driller's side substructure (38) is a mirror image of a driller's side substructure (11). An off-driller's side substructure (38) includes a second mast starting section (40) and an off-driller's floor side box (42) that is connected to the second mast starting section (40). An off-driller's side substructure (38) includes two or more off-driller's elevating legs that engage the off-driller's floor side box (42). Only one off-driller's elevating leg (44) is visible in FIG. 2B from the side view. An off-driller's subbase side box (52) engages the off-driller's elevating legs (44). An off-driller's side substructure (38) includes an off-driller's raising cylinder (54) that is connected to an off-driller's subbase side box (52) and a second mast starting section (40).

As depicted in FIG. 2B, the second truck (58) can include an off-driller's gooseneck (56) connected to the off-driller's floor side box (42). The second mast starting section (40) rests on the off-driller's gooseneck (56). The second multiple axle dolly (60) engages the off-driller's floor side box (42) and supports the off-driller's side substructure (38).

FIG. 2B further shows the location of the off-driller's snubbing cylinder (70) located on the off-driller's subbase side box (52). An off-driller's intermediate cylinder (74) is shown on the off-driller's subbase side box (52) in order to initiate raising the off-driller's subbase side box (52).

The mast (10) is transported in a horizontal orientation on a mast truck (120) with a mast dolly (118), as shown in FIG. 4. The mast (10) has a small road transportation package, a minimum rig-up space requirement, and a low raising cylinder load.

Figure 3:
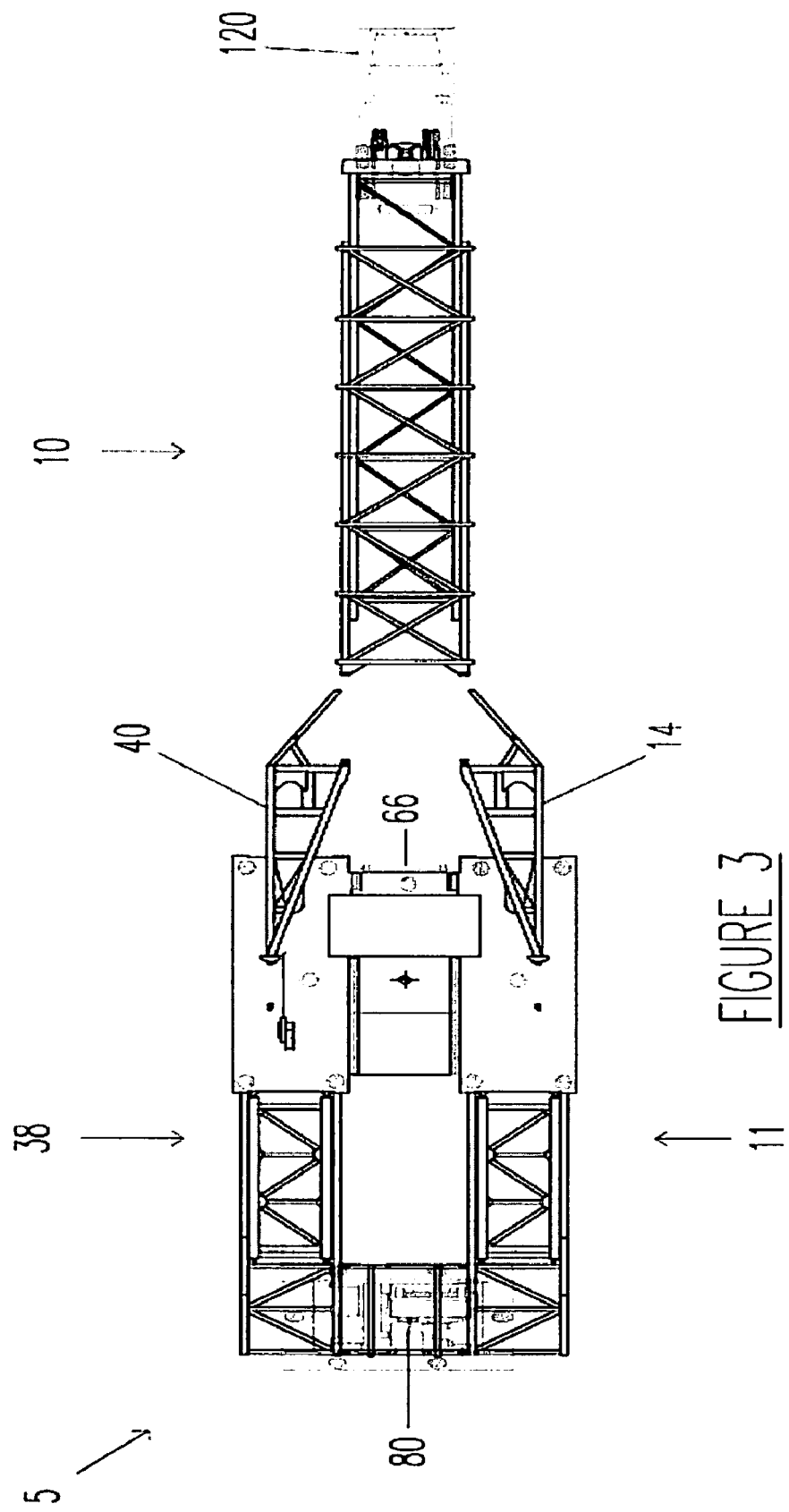
FIG. 3 depicts a top view of the orientation of a driller's side substructure, an off-driller's side substructure, and a mast before engagement with the mast starting sections.

As depicted in FIG. 3, a driller's side substructure (11) and an off-driller's side substructure (38) are situated parallel and in a mirrored position to one another at the drilling site (5). FIG. 4 depicts the driller's side substructure (11) after unloading from a truck (34) and a dolly (36) at a drilling site (5).

The mast starting section legs are widely spaced to allow for a comfortable working space on the floor. The floor space is not compromised by narrow mast as configured in most mobile rigs.

The mast (10) is aligned to the mast starting sections (14 and 40) and brought towards the mast starting sections (14 and 40) using a truck (120) or other similar means, as depicted in FIG. 4. FIG. 20a, FIG. 20b, and FIG. 20c example the steps of the mast being positioned and connected to the mast starting sections. The top end of the mast (10) goes over the end of the mast starting sections (14 and 40) by using an elevating bolster located on the dolly or by using the raising cylinders. The mast starting sections (14 and 40) engage the mast (10) using a connection, such as a hook and pin engagement. When the upper connection of the mast (10) is connected to an individual mast starting section, the bottom connection of the mast (10) can be connected to the same starting section.

After the mast (10) is coupled to the mast starting sections (14 and 40), the truck (120) is removed from the mast (10), as exampled in FIG. 20c. A mast stand can be extended from the mast to the site in order to support the weight of the mast until the mast is raised.

Figure 5:
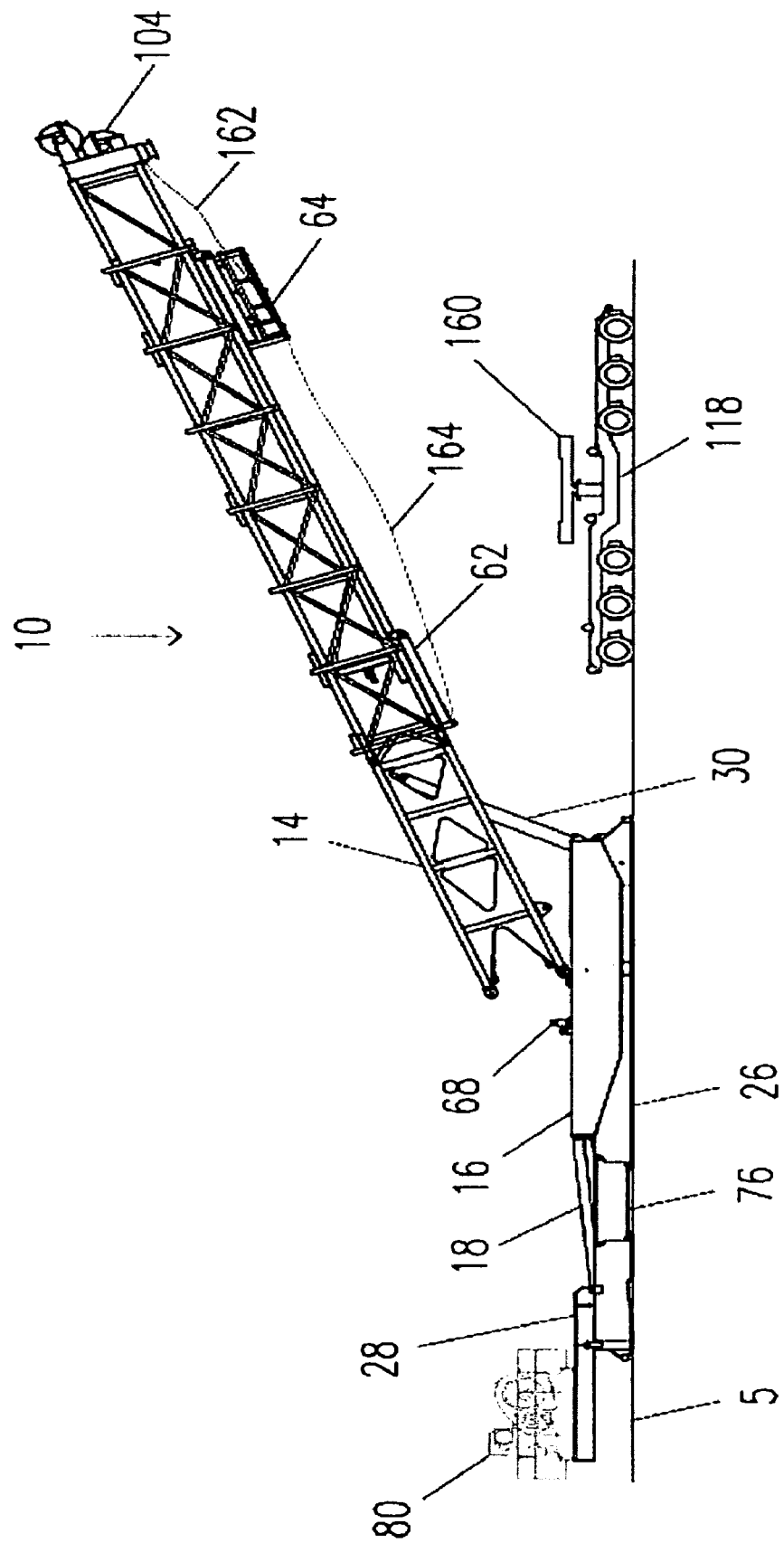
FIG. 5 depicts a driller's side view of a mast in the first stages of raising the mast into position.

FIG. 5 depicts the mast (10) being raised to a vertical orientation by actuating the raising cylinders (30 and 54); the off-driller's is not depicted in FIG. 5 due to the side view. The mast (10) can include a racking board (64) and a belly board (62). The racking board (64) and a belly board (62) can be folded into the mast (10) during transportation, as depicted in FIG. 4 and FIG. 5. When the mast (10) is being raised to a vertical orientation, the racking board (64) and a belly board (62) can be manually or automatically extended or telescoped to an operating height.

The mast (10), the first mast starting section (14), and the second mast starting section (40) are then raised into a substantially vertical orientation using the driller's raising cylinder (30) and the off-driller's raising cylinder (54), simultaneously. FIG. 20d examples the mast leaving the dolly as the mast is positioned into a substantially vertical orientation.

Figure 6:
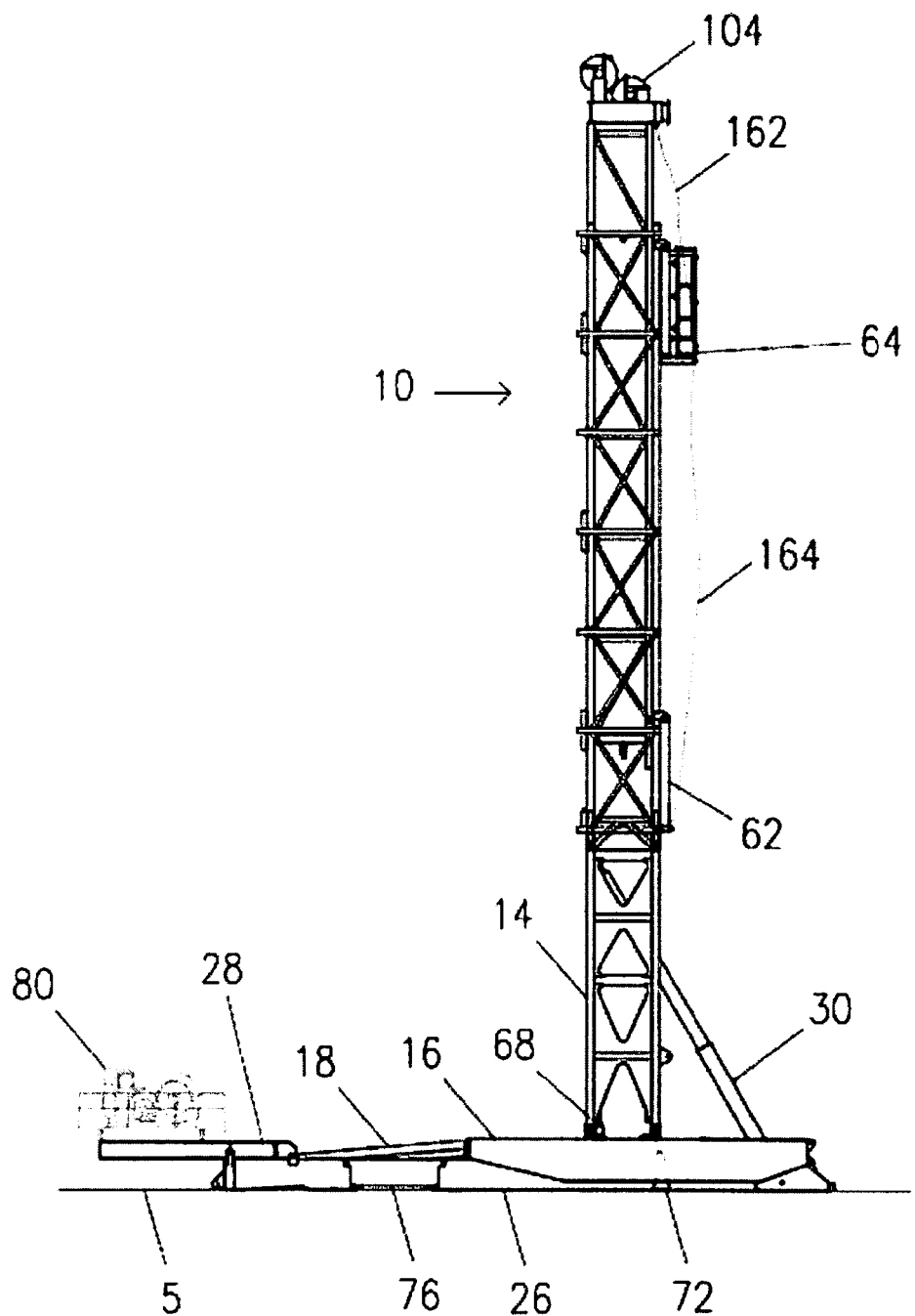
FIG. 6 depicts a driller's side view of a mast after raising to a vertical orientation with a mast snubbing cylinder cradling the mast.

In order to prevent the mast (10) from coming to rest on the substructure with excessive forces and to keep the mast from tipping uncontrollably due to inertia once the mast approaches the vertical orientation, each substructure can include a mast snubbing cylinder (68 and 70) to cushion the mast. FIG. 6 depicts a side view of a mast after rising to a vertical orientation with a mast snubbing cylinder cradling the mast.

Once the mast (10) and the mast starting sections (14 and 40) are in the vertical orientation, a rear mast shoe on each section is pinned to secure the respective mast starting section (14 and 40) to the respective drill floor side box (16 and 42). FIG. 6 depicts the mast (10) in the vertical orientation.

The efficient design and arrangement of the raising cylinders (30 and 54) can keep the cylinders to three stages as compared to four or more on most current designs. The ability to use the same raising cylinders for mast and substructure raising steps reduces costs and complexity of rig-up. The cylinders can be double acting for full retraction of the rods for protection and longer use life. The retraction ports can be located on the cylinder barrel, thereby avoiding cumbersome external piping and hoses to the cylinder rod end.

Figure 8:
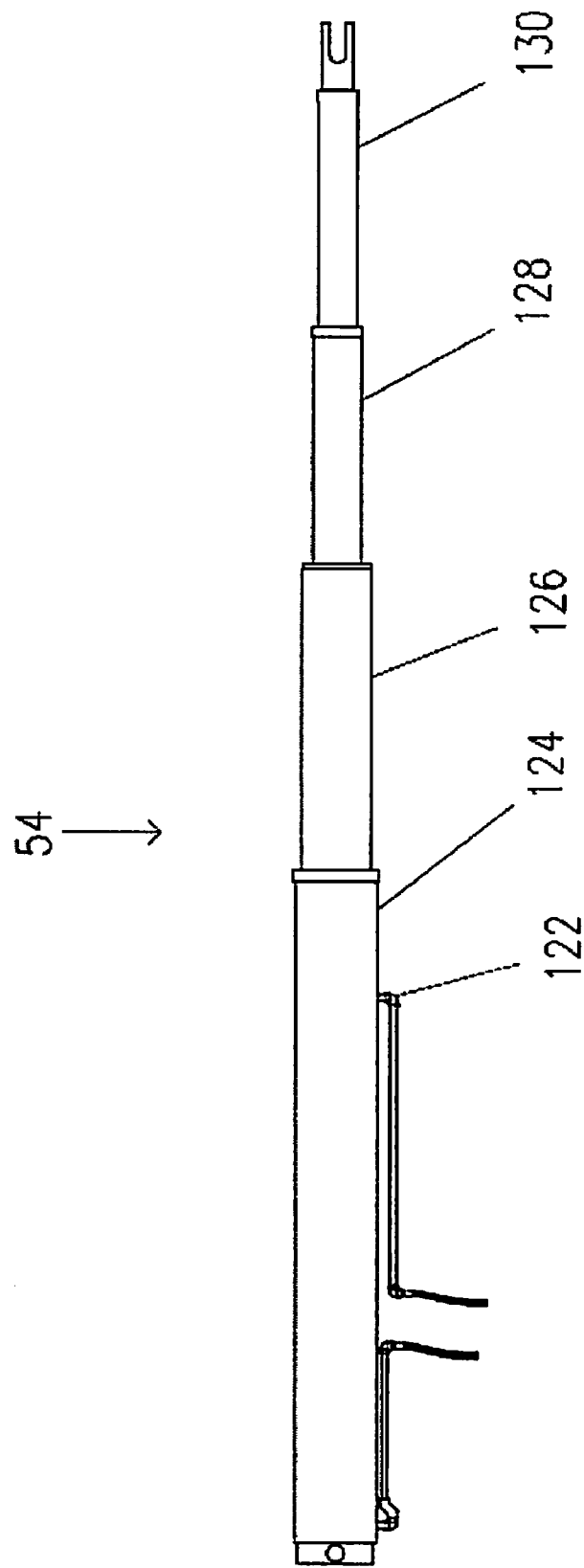
FIG. 8 depicts a side view of an embodiment of a raising cylinder.

FIG. 8 depicts a side view of a raising cylinder (54). The figure shows the embodiment of the three rods (126, 128, and 130) extending from the cylinder barrel (124). The raising cylinder (54) can include a retraction port (122) to actuate the three rods (126, 128, and 130) to return inside of the cylinder barrel (124). The raising cylinders are used in raising the mast and the drill floor and can be located in a cradle in the substructure.

Figure 7:
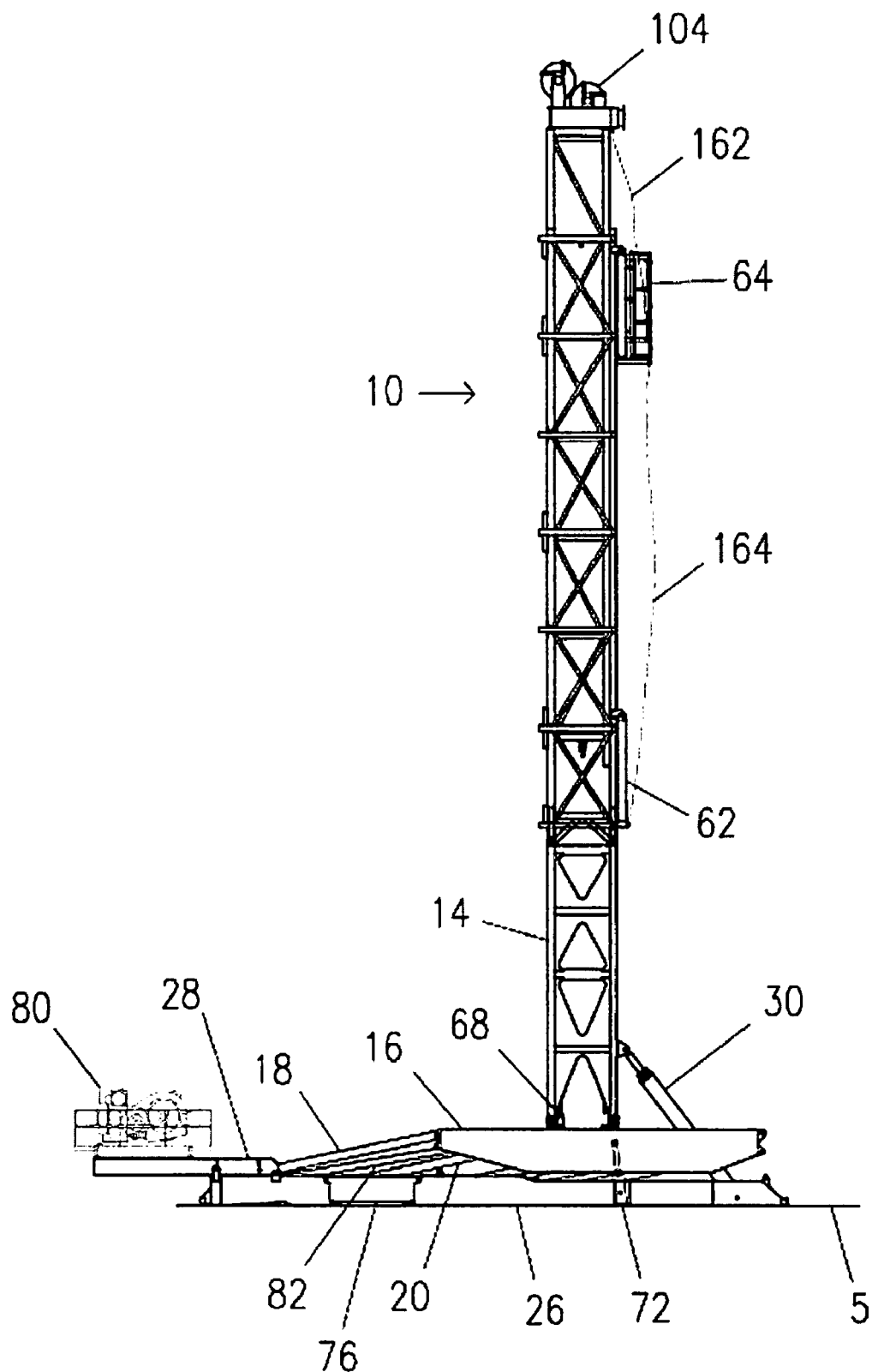
FIG. 7 depicts a driller's side view of the mast and substructure raised to the intermediate height, wherein raising cylinders are retracted and engaged in the substructure raising shoe.

The drill floor side boxes (16 and 42) are raised to an intermediate height using the intermediate raising cylinders (72 and 74). FIG. 7 depicts the driller's floor side box (16) positioned to the intermediate height. FIG. 7 is driller's side view so the off-driller's components are not shown.

The intermediate raising cylinders (72 and 74) are typically connected to the subbase side boxes (26 and 52) and engage the drill floor side boxes (16 and 42) by a raising shoe.

After the mast (10) and the mast starting sections (14 and 40) are in the vertical orientation and the drill floor side boxes (16 and 42) have been raised to the intermediate height, the raising cylinders (30 and 54) are retracted and follow a guide in each respective mast starting sections (14 and 40) and engage into a shoe in each respective mast starting section (14 and 40). The first and second raising cylinders (30 and 54) are engaged with the mast starting sections (14 and 40) using a method allowing for a push compression action. Once the first and second raising cylinders (30 and 54) are engaged with the respective shoes on the respective mast starting sections (14 and 40), the raising cylinders (30 and 54) begin to raise the respective drill floor side boxes (16 and 42).

Figure 9:
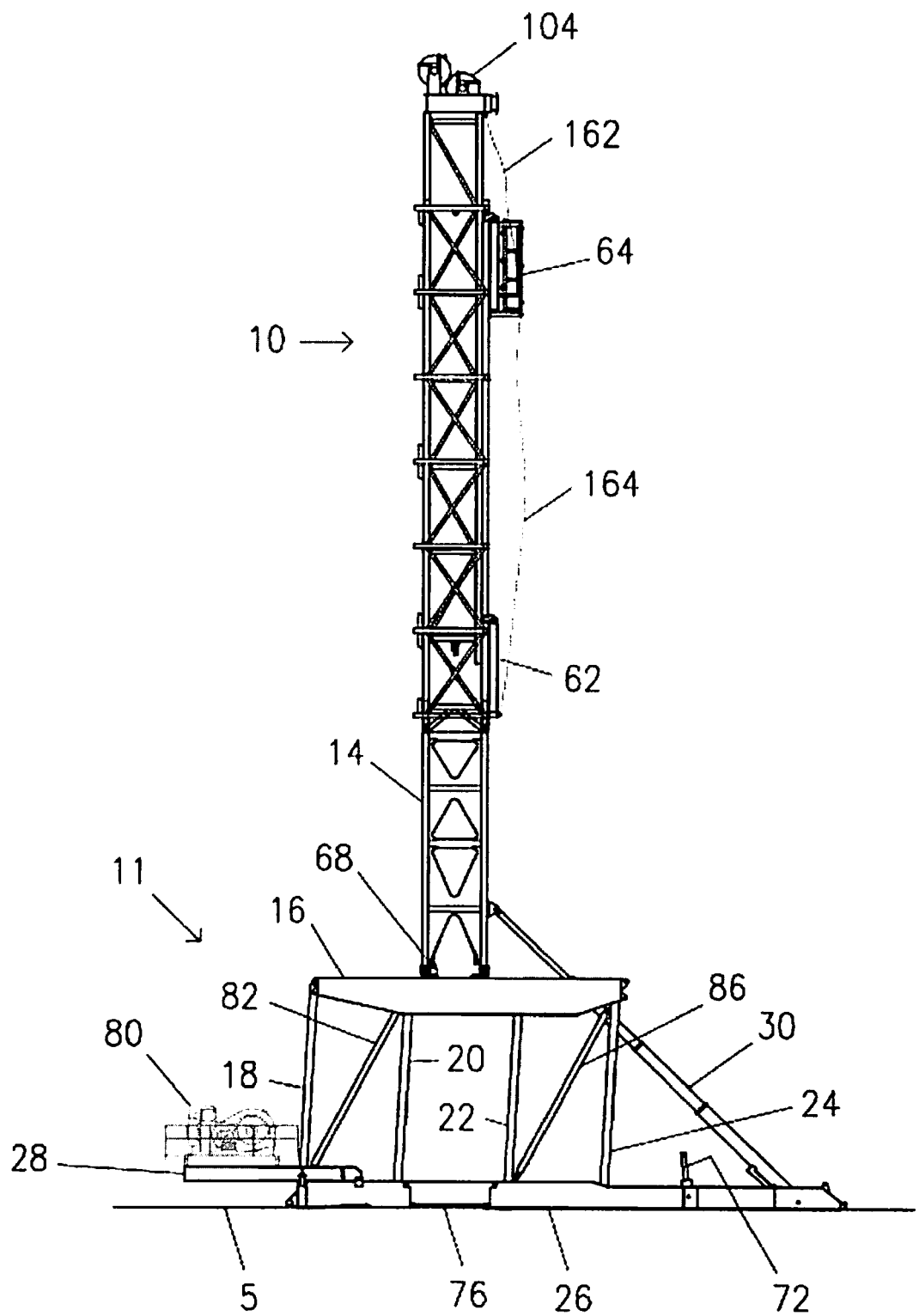
FIG. 9 depicts a driller's side view of the mast and substructure, wherein raising cylinders are raising the drill floor from the intermediate height to the operating height.

FIG. 9 depicts a driller's side view wherein the raising cylinders are continuing to raise the drill floor from the intermediate height to the operating height.

Figure 10:
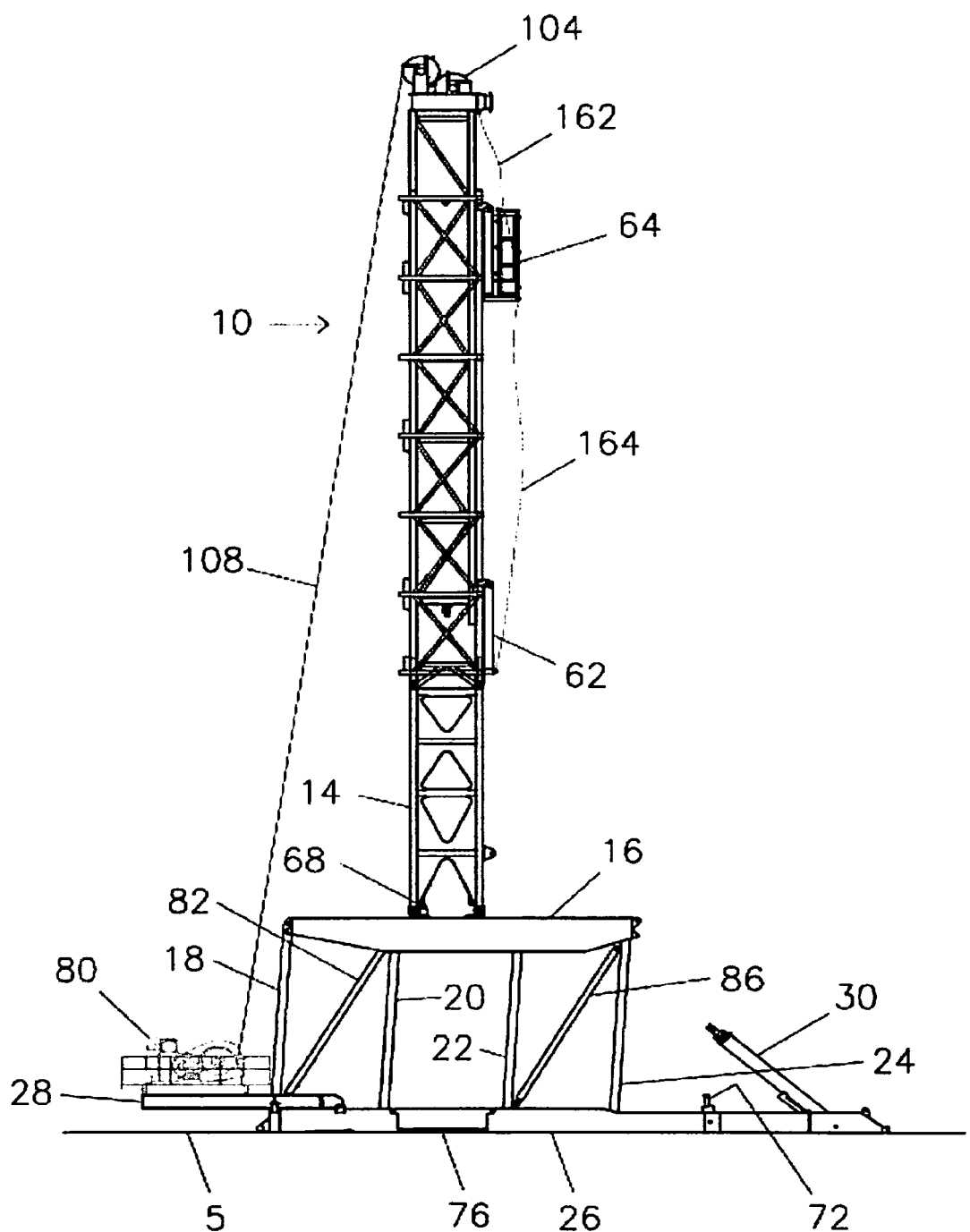
FIG. 10 depicts a driller's side view of the mast and substructure raised to an operating height, wherein raising cylinders are retracted and a wire line extends from a drawworks.

The drill floor side boxes (16 and 42) are finally raised to the operating height using the raising cylinders (30 and 54). FIG. 10 depicts the mobile drilling rig erected at a drilling site (5) with the drill floor side boxes (16 and 42) at the operating height. Once the drill floor side boxes (16 and 42) are raised, the braces (82 and 86) are locked into place to stabilize the drill floor side boxes (16 and 42). FIG. 10 depicts the drill floor at the operating height, the raising cylinders retracted, and the wire line on a drawworks.

Figure 11:
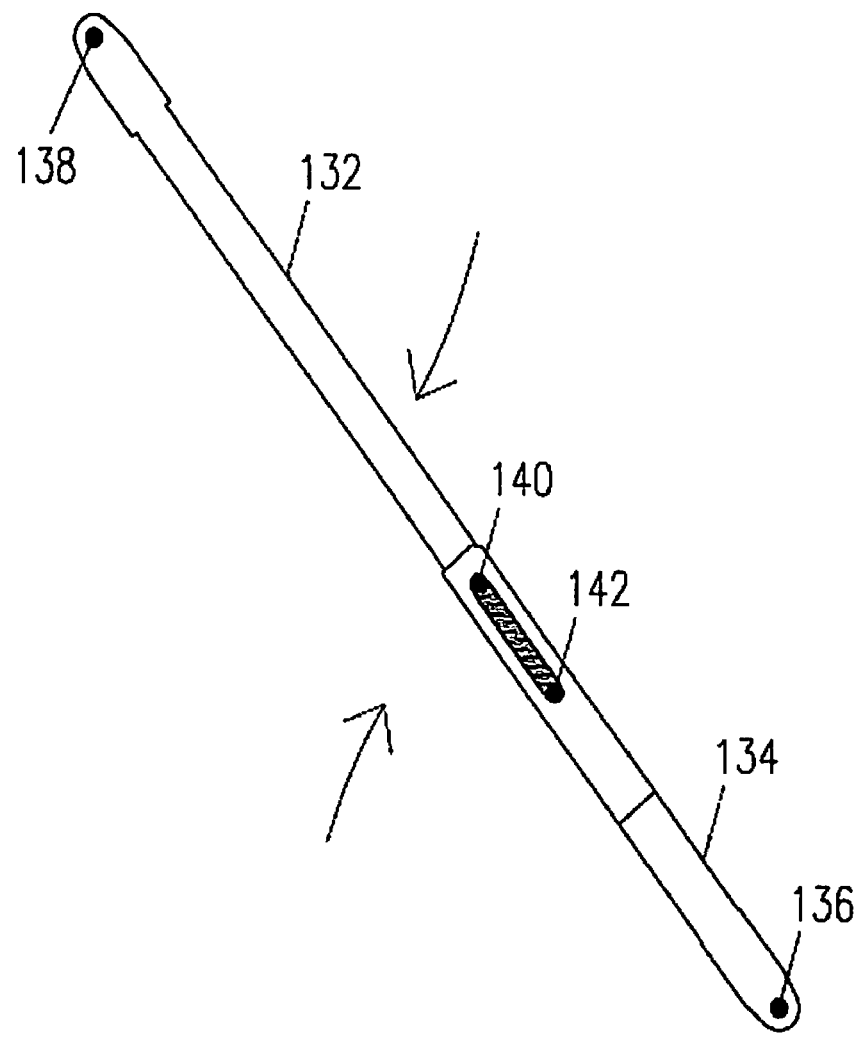
FIG. 11 depicts an embodiment of braces used to interconnect the driller's side substructure and off-driller's side substructure.

FIG. 11 depicts an embodiment of a brace, which is a component of the bracing system that connects the driller's side substructure to the off-driller's side substructure. FIG. 11 shows the male brace portion (132) inserted into the female brace portion (134) until the correct length is obtained. The male brace portion (132) is attached to the female brace portion (134) by the use of locking pins (140 and 142). The brace portions (132 and 134) and connected to the structure itself using locking pins (136 and 138).

The mast (10) on the drilling rig can be a telescoping mast. The telescoping mast can be raised using a hydraulic cylinder that keeps drawworks (80) power-up out of the critical path of rig-up sequence. FIG. 1 depicts the mobile drilling rig with telescoping mast fully erected at a drilling site (5). Installation of the mast can be done on the pipe lay down side of a drilling site (5) and contributes to the minimum rig-up space requirement.

The drawworks (80) is installed simultaneously with the mast allowing for better hook-up time. The doghouse and driller's cabin are raised simultaneous with the drill floor. The assembly requires few field assembly connections. Further, minimum space is required on the drawworks (80) side of the rig since the rig is not installed from that side. The low assembly height means that the rig is easily offloaded from truck or trailer bed heights to the assembled position without intermediate handling. The integration of the crown, traveling equipment, and wire line reel contributes to fast rig-up. The assembled floor and substructure arrangement lends itself to efficient winterization.

An embodiment of the mobile drilling rig includes a center drill floor section inserted between, and connected to, the driller's side floor side box and the off-driller's floor side box. FIG. 3 depicts the third drill floor center section (66). A raising cylinder can be located in the center drill floor, in addition to or exclusive of, the raising cylinders in the substructures. The raising cylinder in the center section can be connected to the mast in order to raise the mast and the drill floor.

Figure 12:
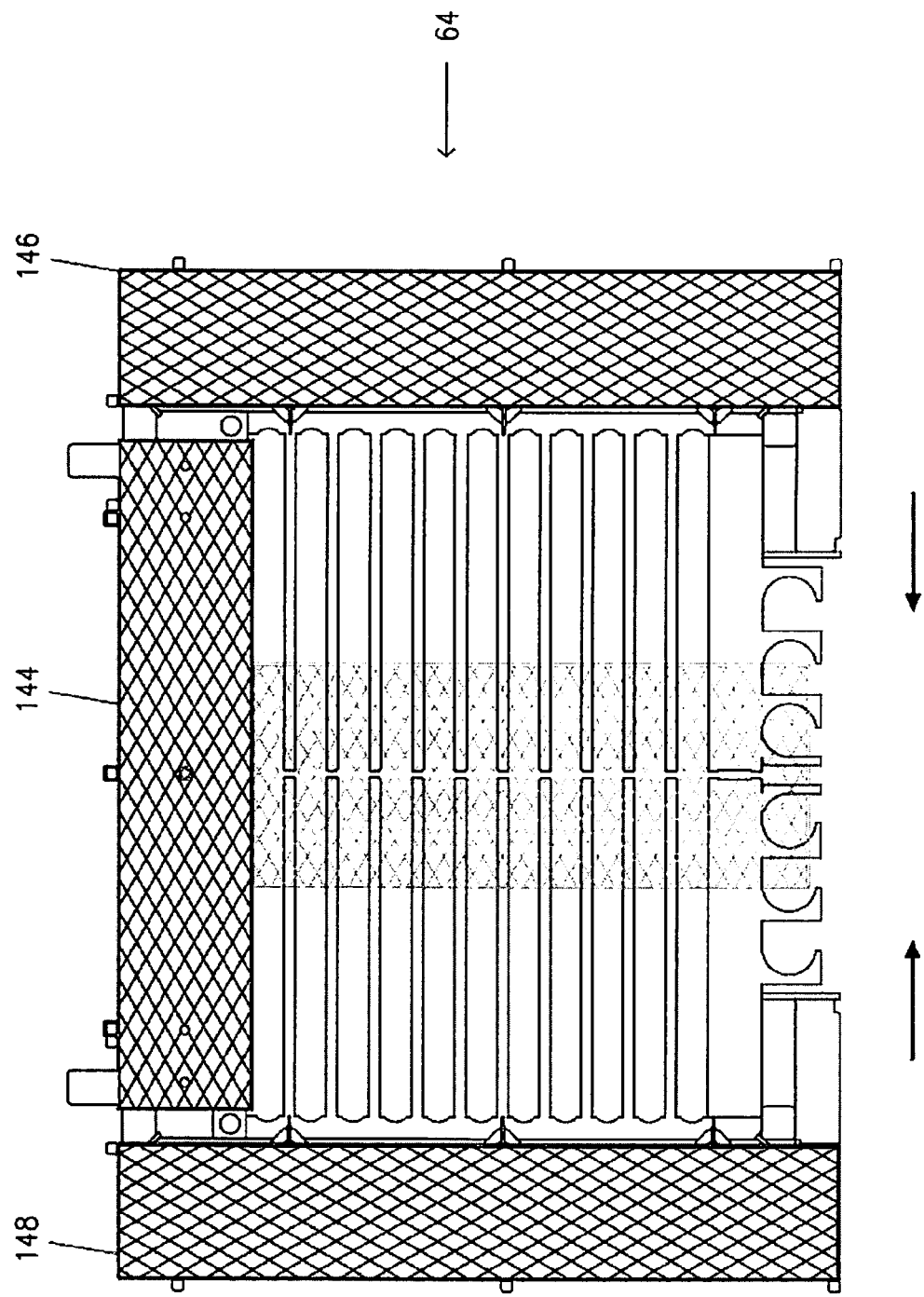
FIG. 12 depicts an embodiment of an adjustable racking board in a transport configuration.
Figure 13:
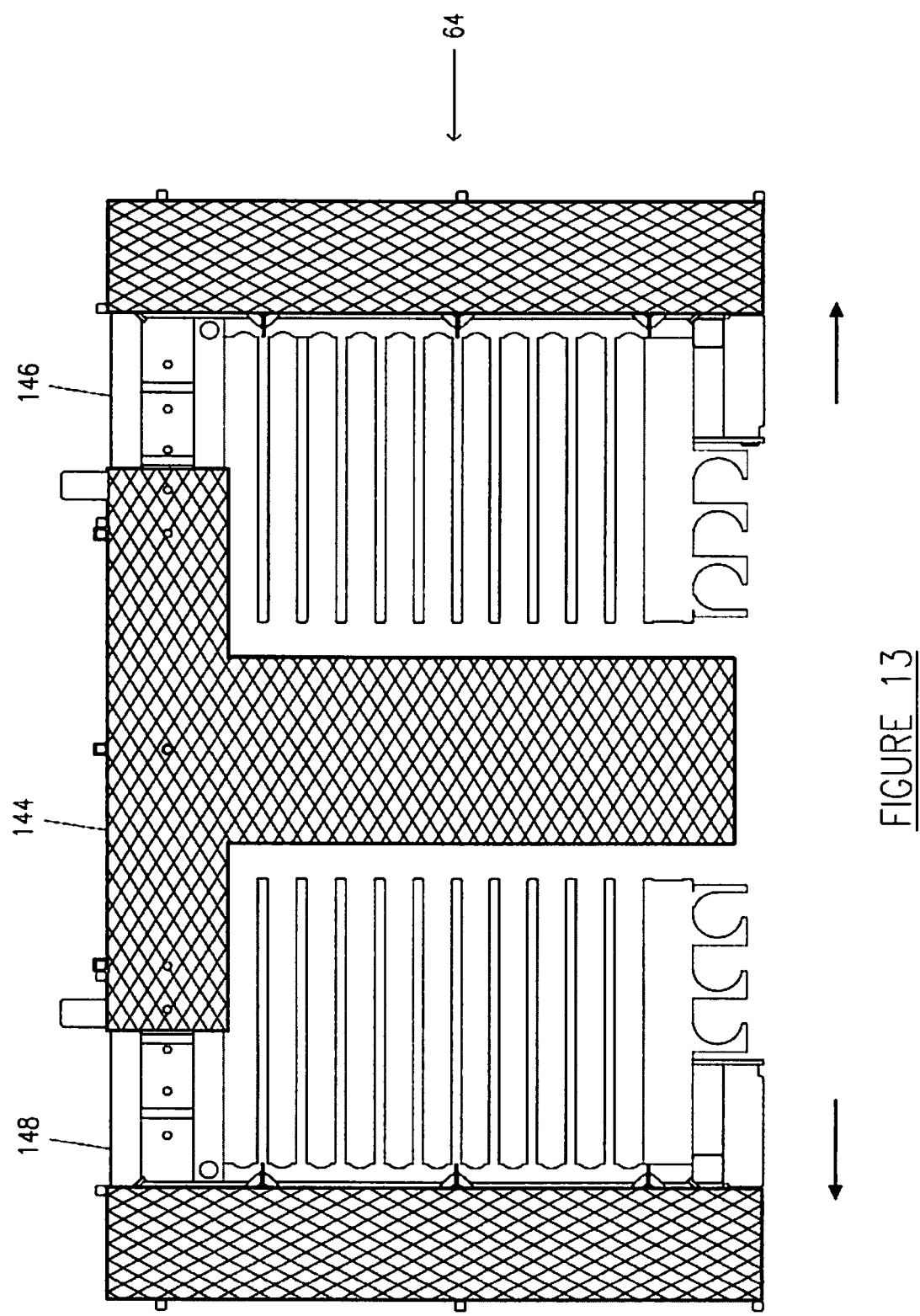
FIG. 13 depicts an embodiment of an adjustable racking board in an operational configuration.

As discussed above, the mast (10) can include a racking board (64) and a belly board (62) that can be folded into the mast (10) during transportation, as depicted in FIG. 4 and FIG. 5. FIG. 12 depicts an adjustable racking board (64) in a transport configuration, wherein the outside racking frames (146 and 148) are located near the main racking frame (144). FIG. 13 depicts an adjustable racking board (64) in an operational configuration, wherein the outside racking frames (146 and 148) slide away from the main racking frame (144) creating a larger working area.

Figure 14:
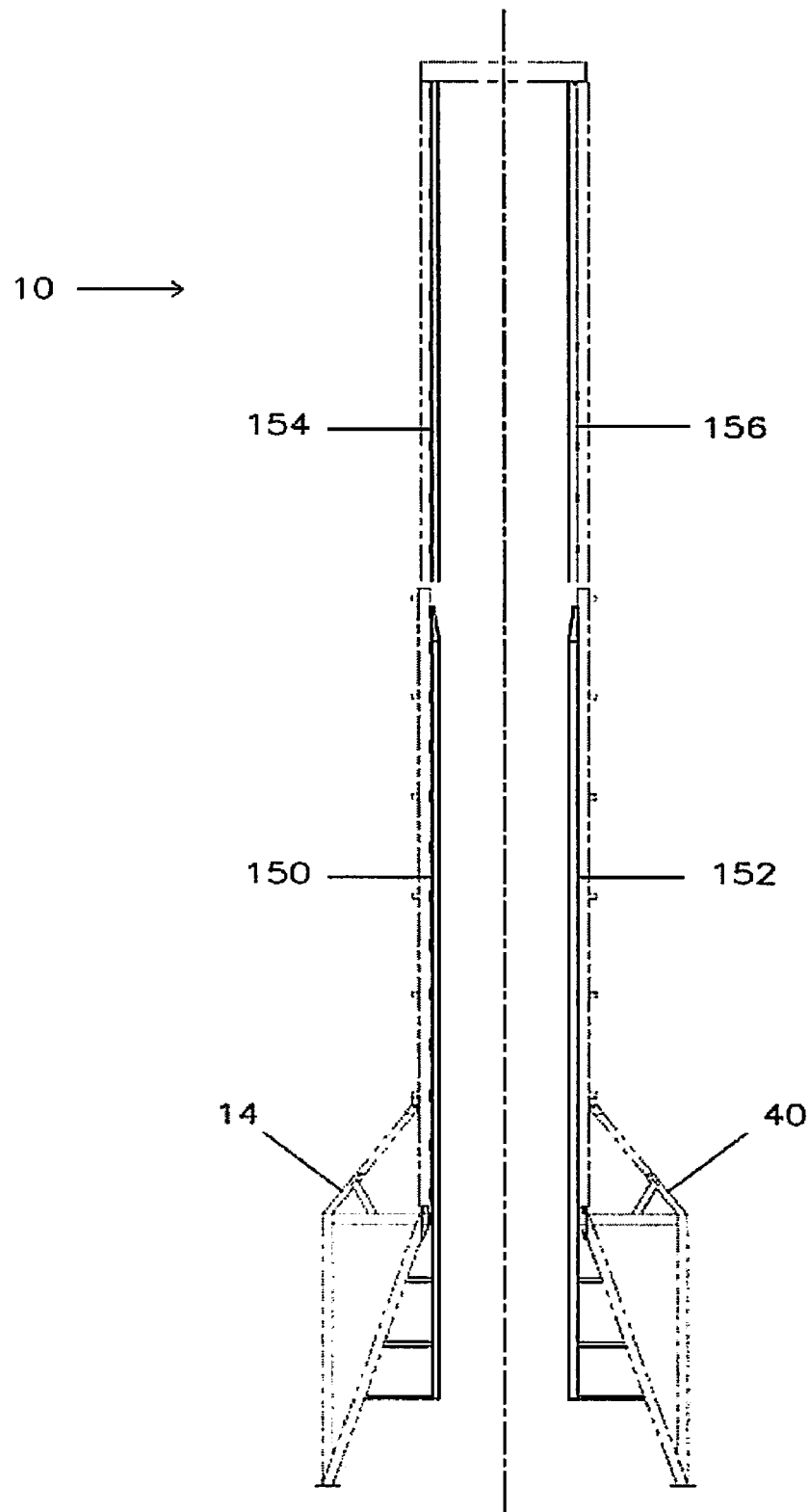
FIG. 14 depicts an elevation of the top drive guide rails usable with the embodied mobile drilling rig.

FIG. 14 depicts an elevation view of the top drive guide rails in the telescoping mast (10). FIG. 15 depicts a cross sectional detail view of the top drive guide rails showing the relationship of the upper section guide rails (154 and 156) and the lower section guide rails (150 and 152).

Figure 16:
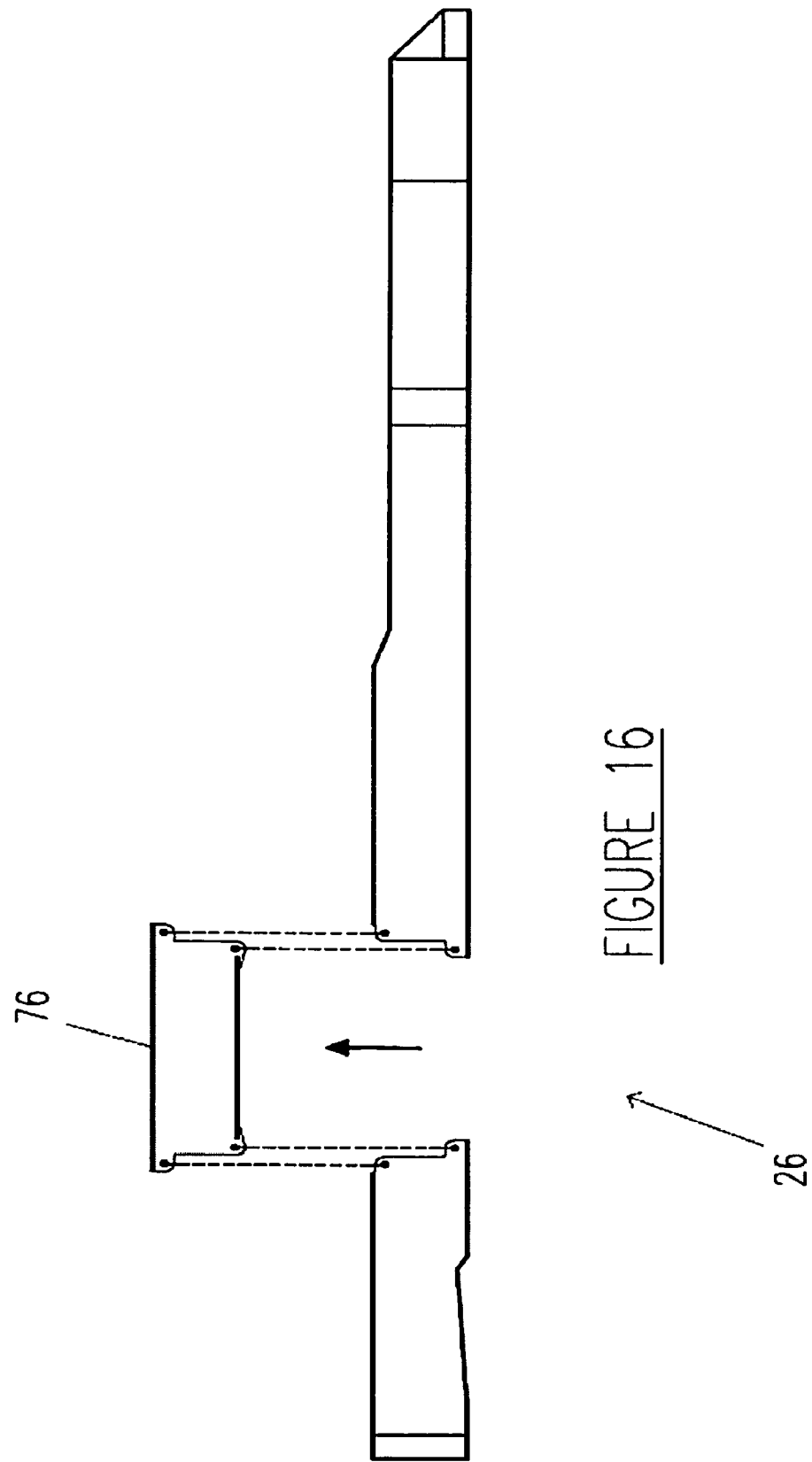
FIG. 16 depicts a side view of the substructure subbase with removable center section to allow multiple well access of the rig.

The drilling rig can be moved from one well to another well clearing existing wellheads. FIG. 16 depicts an aspect of the embodied mobile drilling rig to accommodate multiple wells. Each substructure can include a subbase center section that is removable to permit operational access to a rig cellar and clearance to skid over existing wellheads. FIG. 16 depicts an embodiment of the driller's side subbase center section (76) as removable from the driller's subbase side box (26).

The mast can be raised perpendicular to a row of wells and the substructure has a generous wellhead skid clearance making the rig efficient for multiple well operations. The cellar can be opened along the well row allowing skidding from well to well without rigging down.

Figure 17:
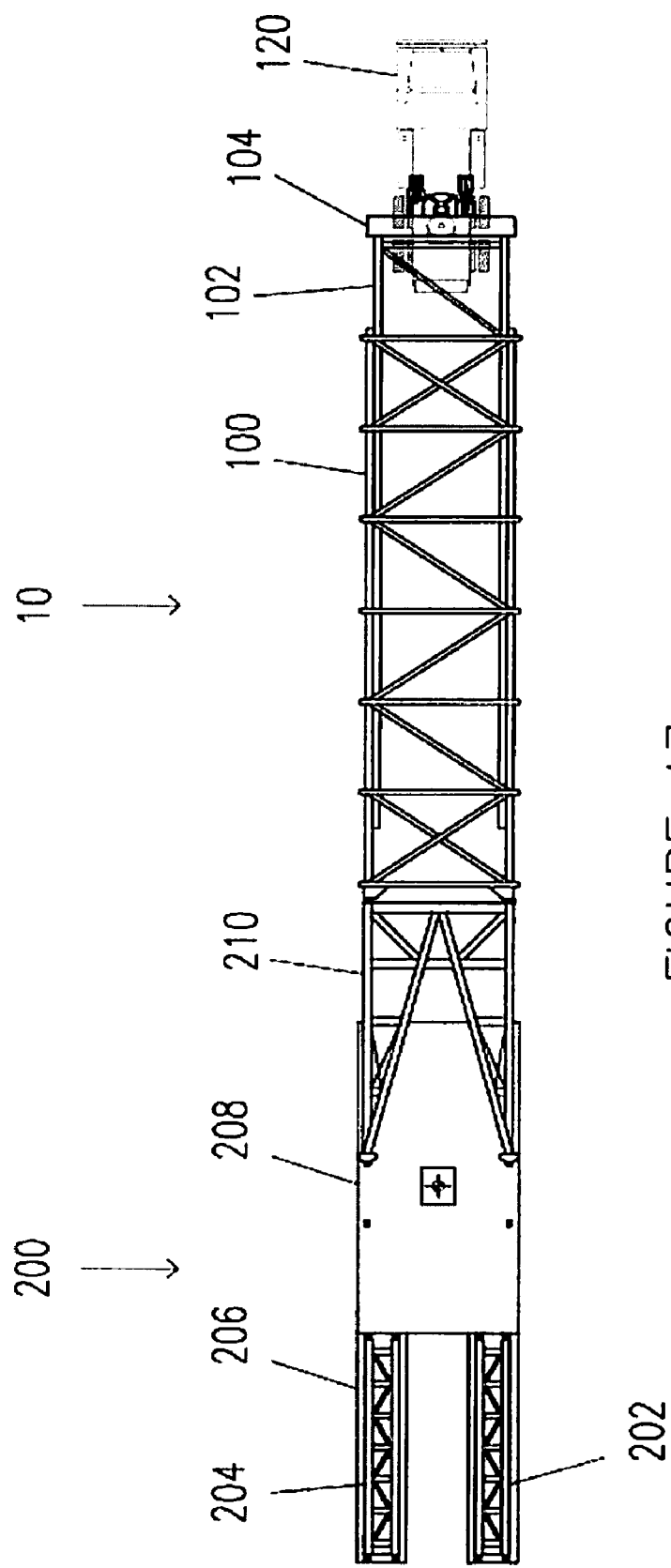
FIG. 17 depicts an embodiment of a mobile drilling rig that can include a mast and a single unit substructure assembly.

FIG. 17 depicts an embodiment of a mobile drilling rig that can include a mast and a single unit substructure assembly (200). The single unit substructure assembly (200) comprises a single mast starting section (210); a drill floor (208) connected to the mast starting section; and two or more elevating legs (202 and 204) connected to the drill floor (208). The single unit assembly includes a subbase (206) that engages the elevating legs (202 and 204). The single unit assembly includes one or more raising cylinders connected to the subbase (206) and the mast starting section (210). The mast starting section (210) is positioned for transport on top of the drill floor (208) and the raising cylinder is connected to the mast starting section (210) and the subbase (206).

Figure 18A:
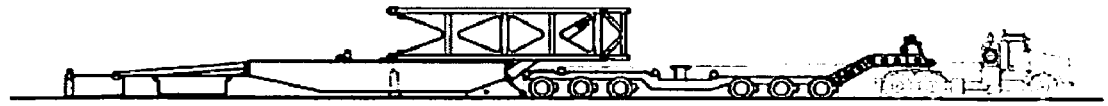
FIG. 18a depicts a side view of a step in the method of loading a substructure onto a truck and dolly.

FIG. 18a through FIG. 18g depict a side view of a method of loading a substructure onto a truck and dolly. An embodiment of the method entails positioning a truck with a dolly linearly in relation to the substructure (FIG. 18a). The dolly is connected to the truck by a gooseneck. The truck includes a winch with an associated wireline; the dolly includes rollers disposed on the top surface and a sheave block. The dolly can be a self-steering dolly comprising at least six sets of wheels and a dolly bolster located centrally on the dolly.

Figure 18B:
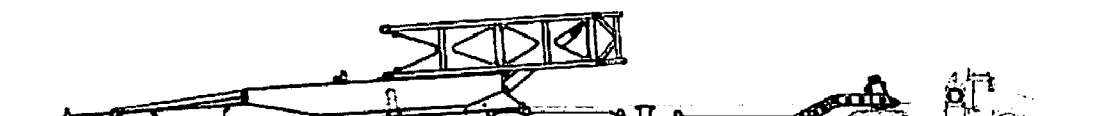
FIG. 18b depicts a side view of a step in the method of loading a substructure onto a truck and dolly.
Figure 18C:
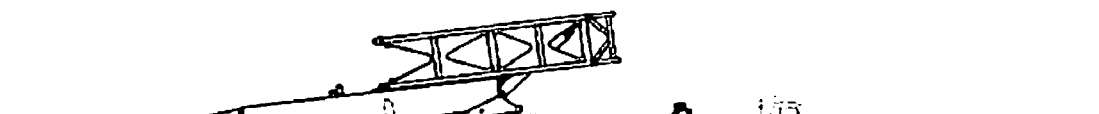
FIG. 18c depicts a side view of a step in the method of loading a substructure onto a truck and dolly.
Figure 23:
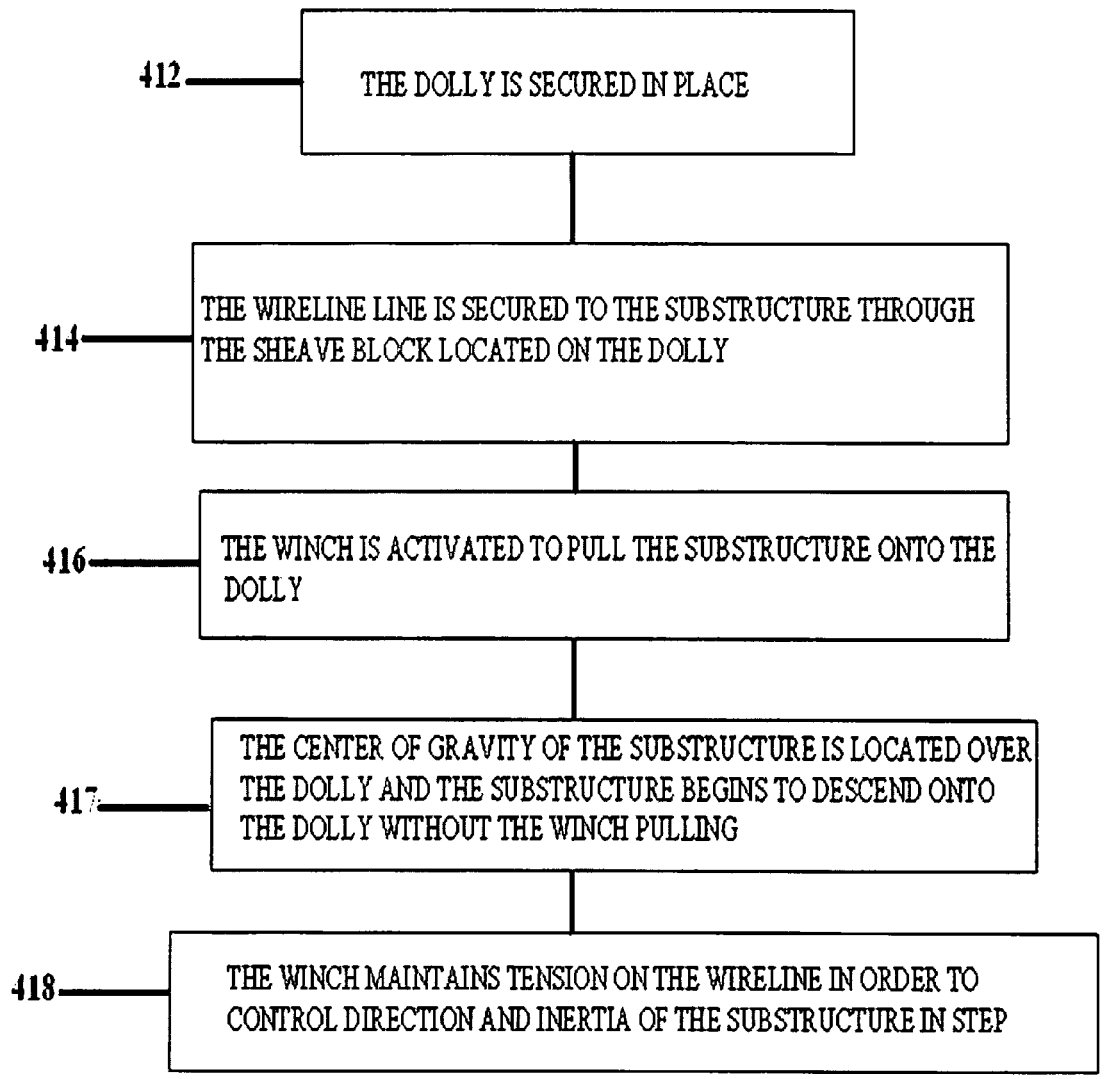
FIG. 23 depicts a flow diagram for the method of loading a substructure onto a truck and dolly.
Figure 24:
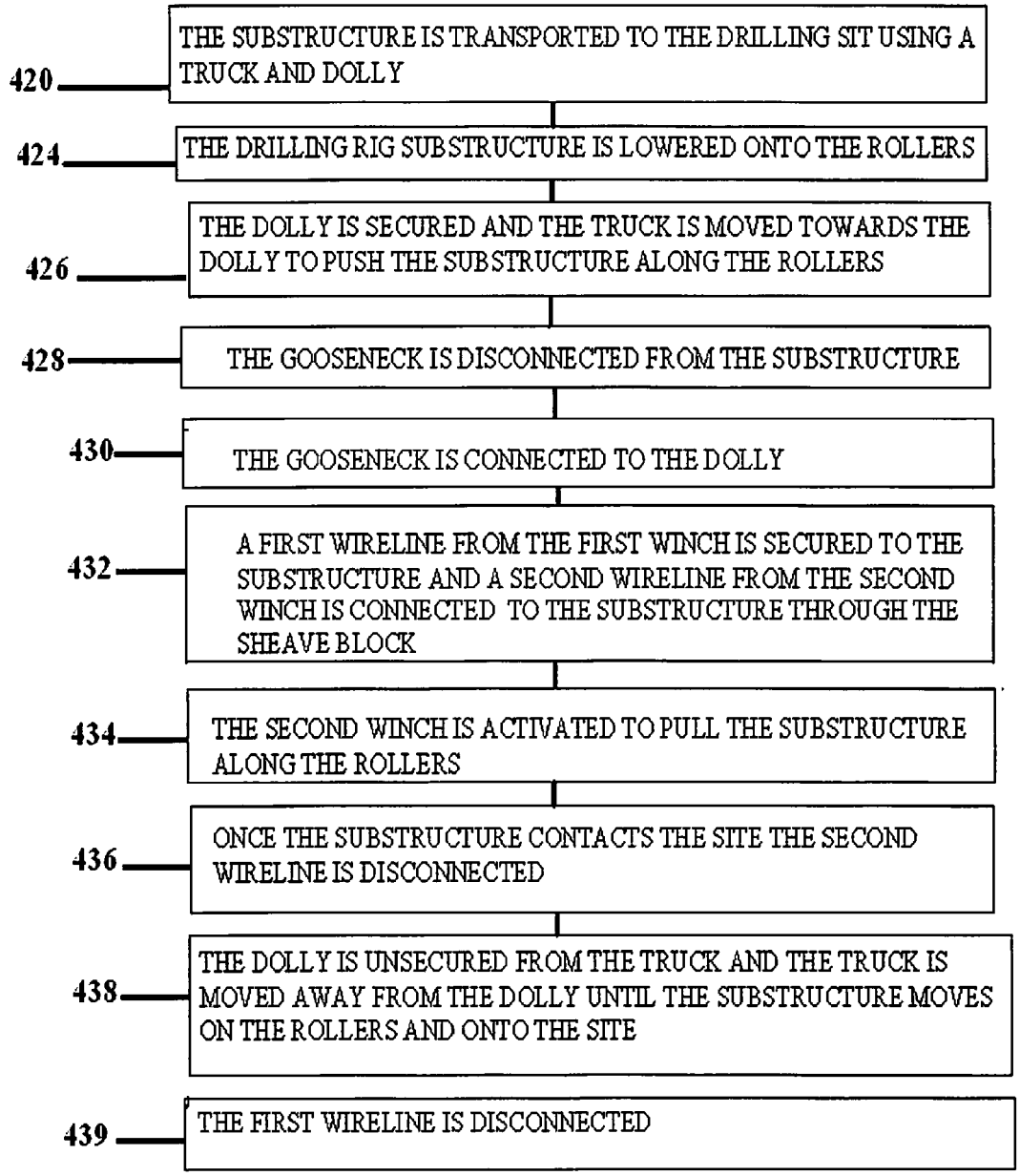
FIG. 24 depicts a method for unloading a drilling rig structure at a drilling site.

The dolly is secured in place, for example by locking the wheels. The wireline line is secured to the substructure. The winch is activated to pull the substructure onto the dolly (FIG. 18b). Eventually, the center of gravity of the substructure is located over the dolly and the substructure will begin to descend onto the dolly without the winch pulling (FIG. 18c). The winch maintains tension on the wireline in order to controls direction and inertia of the substructure. FIG. 23 depicts a flow diagram for the method of loading a substructure onto a truck and dolly. In step 412 the dolly is secured in place, for example by locking the wheels. The wireline line is secured to the substructure through the sheave block located on the dolly in step 414. The winch is activated to pull the substructure onto the dolly in step 416. In step 417 the center of gravity of the substructure is located over the dolly and the substructure begins to descend onto the dolly without the winch pulling. The winch maintains tension on the wireline in order to control direction and inertia of the substructure in step 418. In FIG. 24 a method for unloading a drilling rig structure at a drilling site is depicted. In step 420 the substructure is transported to the drilling sit using a truck and dolly. In step 424 the drilling rig substructure is lowered onto the rollers. In step 426 the dolly is secured and the truck is moved towards the dolly to push the substructure along the rollers. The gooseneck is disconnected from the substructure in step 428. In step 430 the gooseneck is connected to the dolly. A first wireline from the first winch is secured to the substructure and a second wireline from the second winch is connected to the substructure through the sheave block in step 432. In step 434 the second winch is activated to pull the substructure along the rollers. In step 436 once the substructure contacts the site the second wireline is disconnected. Then in step 438 the dolly is unsecured from the truck and the truck is moved away from the dolly until the substructure moves on the rollers and onto the site. In step 439 the first wireline is disconnected.

Figure 18D:
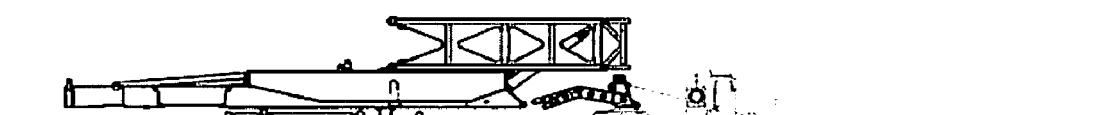
FIG. 18d depicts a side view of a step in the method of loading a substructure onto a truck and dolly.
Figure 18E:
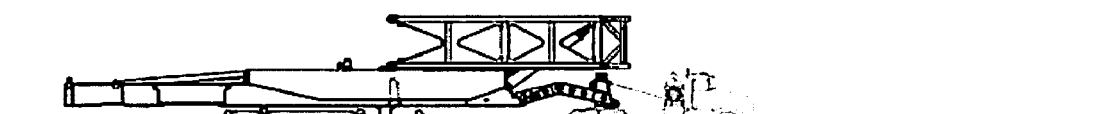
FIG. 18e depicts a side view of a step in the method of loading a substructure onto a truck and dolly.
Figure 18F:
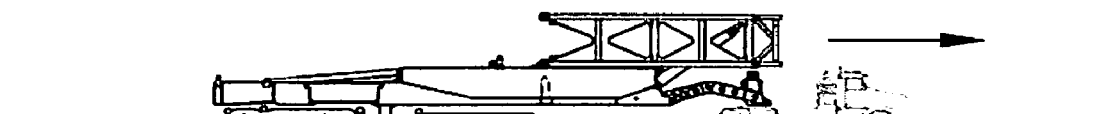
FIG. 18f depicts a side view of a step in the method of loading a substructure onto a truck and dolly.
Figure 18G:
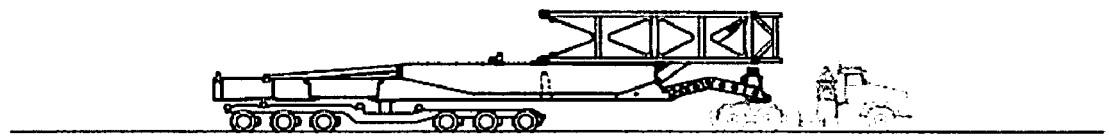
FIG. 18g depicts a side view of a step in the method of loading a substructure onto a truck and dolly.

Once the substructure is flat on the dolly, the winch pulls the substructure along the rollers until the substructure reaches the gooseneck (FIG. 18d). The gooseneck is disconnected from the dolly and connected to the substructure (FIG. 18e). While the dolly is still secured, the truck pulls the substructure via the gooseneck until the substructure is completely located on the dolly and in position for transport (FIG. 18f and FIG. 18g). If a dolly bolster is present, the dolly bolster can position the substructure into a final elevation for transportation.

Figure 19A:
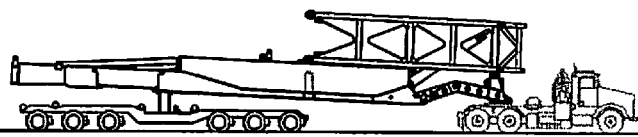
FIG. 19a depicts a side view of a step in the method of unloading a substructure from a truck and dolly.
Figure 19B:
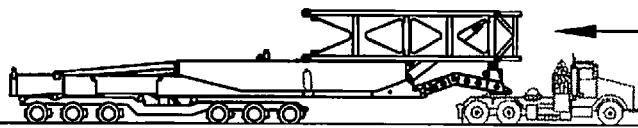
FIG. 19b depicts a side view of a step in the method of unloading a substructure from a truck and dolly.

FIG. 19a through FIG. 19g depict a side view of a method of unloading a substructure from a truck and dolly. An embodiment of the method entails transporting the substructure to the drilling site using a truck and a dolly (FIG. 19a). The truck includes at least two winches and a gooseneck connected to the substructure. The dolly includes rollers and a sheave block. The substructure is lowered onto the rollers on the dolly (FIG. 19b). The substructure can be lowered using a dolly bolster located centrally on the dolly. The substructure rests on the dolly bolster during transportation and can be lowered to lower the substructure onto the rollers.

Figure 19C:
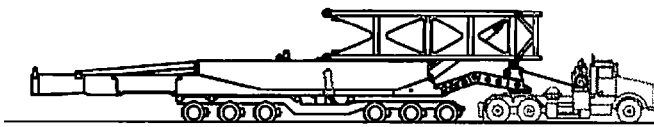
FIG. 19c depicts a side view of a step in the method of unloading a substructure from a truck and dolly.
Figure 19D:
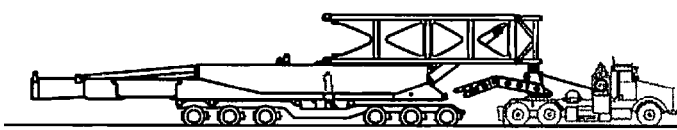
FIG. 19d depicts a side view of a step in the method of unloading a substructure from a truck and dolly.
Figure 19E:
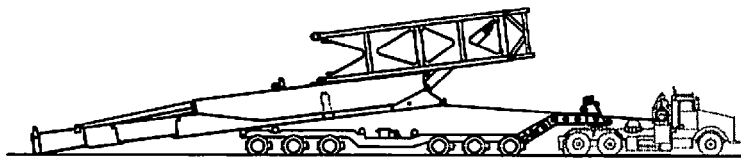
FIG. 19e depicts a side view of a step in the method of unloading a substructure from a truck and dolly.

Next, the dolly is secured in place, and the truck moves toward the substructure pushing the substructure along the rollers via the gooseneck (FIG. 19b and FIG. 19c). The gooseneck is disconnected from the substructure and connected to the dolly (FIG. 19d and FIG. 19e). Attaching the gooseneck to the dolly helps in stabilizing the dolly and prevents the dolly from tipping during unloading A first wireline is connected from the first winch to the substructure and a second wireline is connected from the second winch to the substructure through the sheave block. The method continues by activating the second winch to pull the substructure along the rollers and disconnecting the second wireline once the substructure contacts the site. The second winch pulls the substructure along the rollers until the center of gravity of the substructure is located beyond the dolly. The first winch controls direction and inertia of the substructure by maintaining a constant tension. The first wireline is released as the substructure moves along the rollers in order to maintain the tension.

Figure 19F:
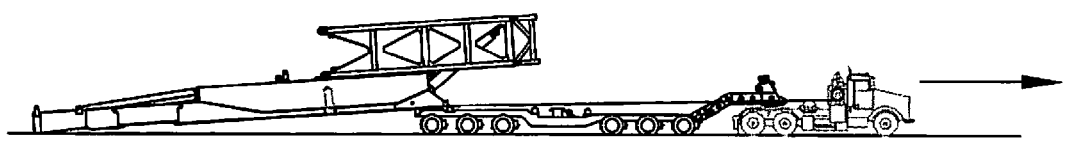
FIG. 19f depicts a side view of a step in the method of unloading a substructure from a truck and dolly.
Figure 19G:
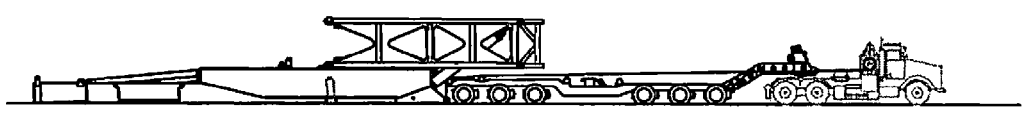
FIG. 19g depicts a side view of a step in the method of unloading a substructure from a truck and dolly.
Figure 21A:
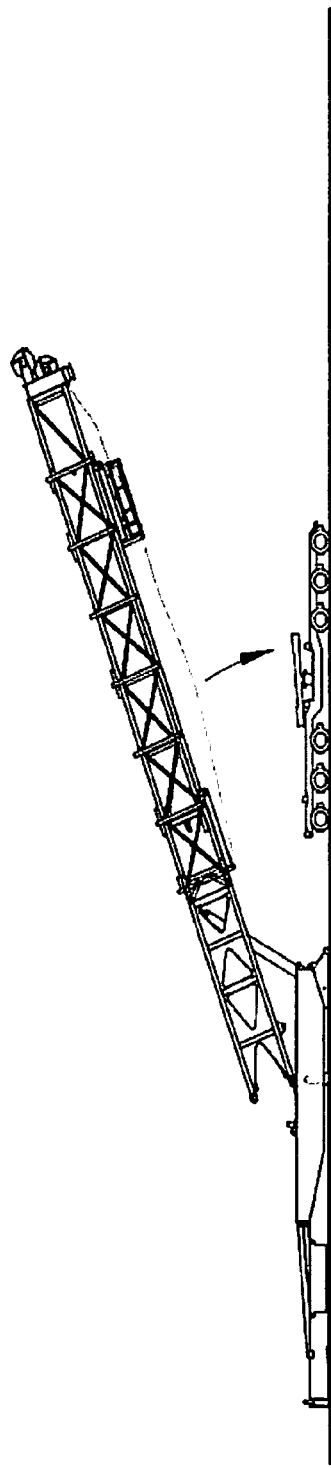
FIG. 21a depicts a side view of a step in the method of lowering the mast from a vertical orientation and disconnecting the mast from the substructure.
Figure 21B:
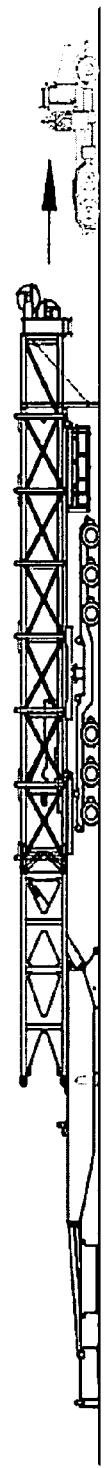
FIG. 21b depicts a side view of a step in the method of lowering the mast from a vertical orientation and disconnecting the mast from the substructure.
Figure 21C:
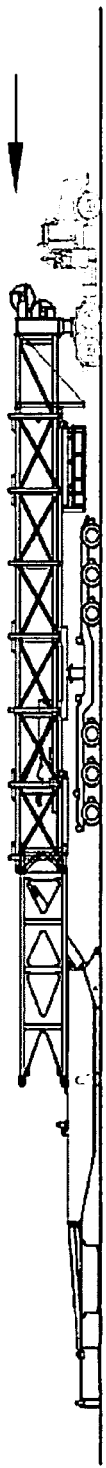
FIG. 21c depicts a side view of a step in the method of lowering the mast from a vertical orientation and disconnecting the mast from the substructure.
Figure 21D:
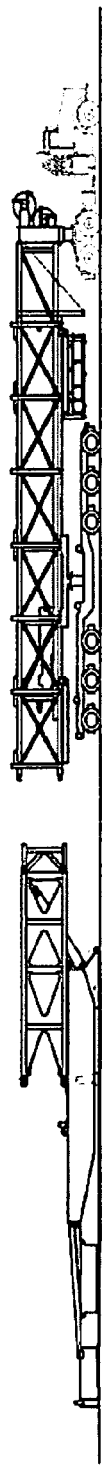
FIG. 21d depicts a side view of a step in the method of lowering the mast from a vertical orientation and disconnecting the mast from the substructure.

The method ends by unsecuring the dolly and moving the truck and the dolly in an opposite direction (FIG. 19f). By moving the truck, the dolly is removed from beneath the substructure and the substructure is placed on the site (FIG. 19g). The first wireline is disconnected.

Figure 22:
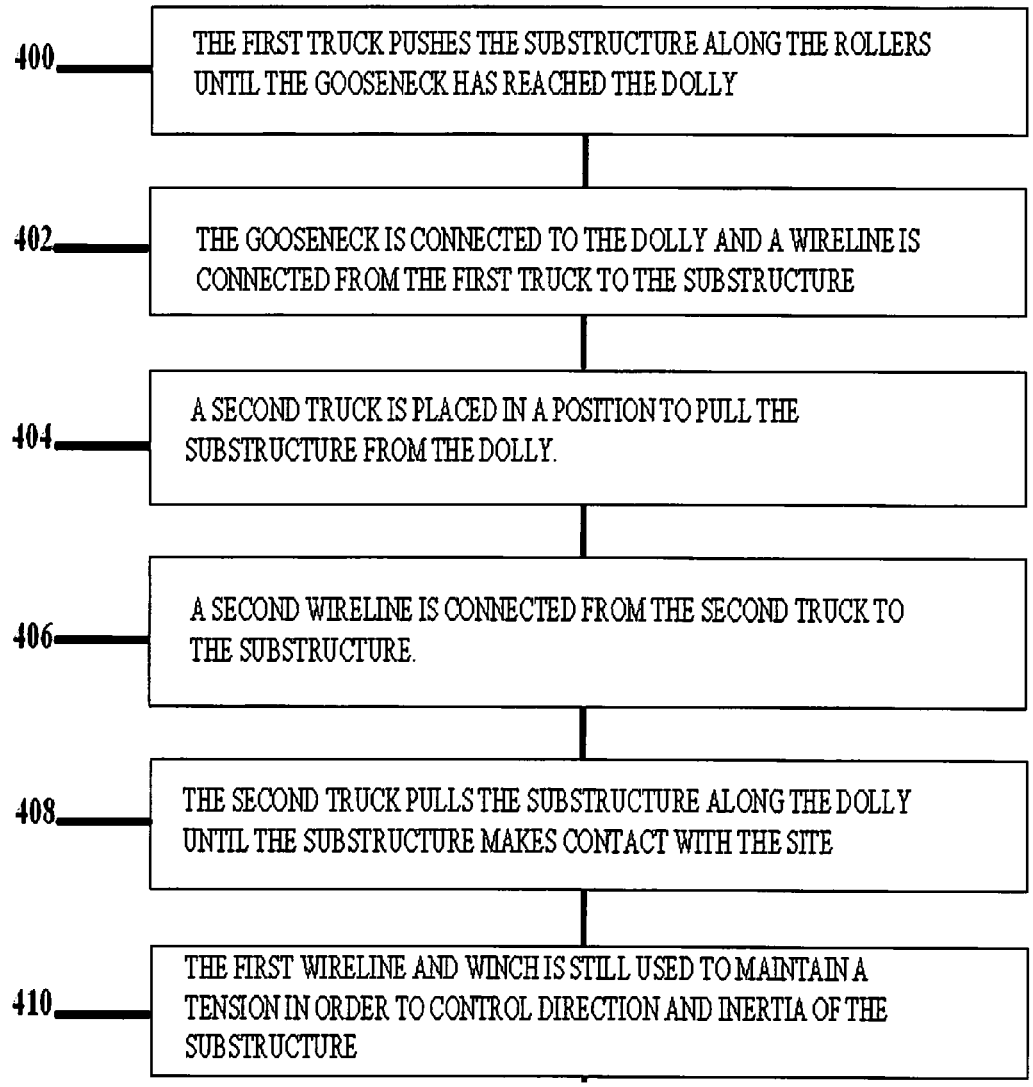
FIG. 22 depicts an embodiment of the method for unloading the substructure performed using two trucks and one winch.

FIG. 22, depicts an embodiment of the method for unloading the substructure performed using two trucks and one winch. In step 400 the first truck pushes the substructure along the rollers until the gooseneck has reached the dolly. In step 402 the gooseneck is connected to the dolly and a wireline is connected from the first truck to the substructure. In step 404 a second truck is placed in a position to pull the substructure from the dolly. In step 406 a second wireline is connected from the second truck to the substructure. In step 408 the second truck pulls the substructure along the dolly until the substructure makes contact with the site. The first wireline and winch is still used to maintain a tension in order to control direction and inertia of the substructure in step 410.

Once the substructure contacts the site, the second wireline is disconnected. The method ends by unsecuring the dolly and moving the truck and the dolly in an opposite direction (FIG. 19f). By moving the truck, the dolly is removed from beneath the substructure and the substructure is placed on the site (FIG. 19g). The first wireline is disconnected.

FIG. 21a through FIG. 21d depict a side view of a method of lowering the mast from a vertical orientation and disconnecting the mast from the substructure.

The embodiments have been described in detail with particular reference to certain embodiments thereof, but it will be understood that variations and modifications can be effected within the scope of the embodiments, especially to those skilled in the art.

What is claimed is:

1. A method of unloading a drilling rig substructure at a drilling site, wherein the method comprises the steps:
   a. transporting the substructure to the drilling site using a truck and a dolly, wherein the truck comprises a first winch, a second winch, and a gooseneck connected to the substructure, and wherein the dolly comprises a plurality of rollers and a sheave block;
   b. lowering the drilling rig substructure onto the rollers;
   c. securing the dolly and moving the truck towards the dolly to push the substructure along the rollers;
   d. disconnecting the gooseneck from the substructure and connecting the gooseneck to the dolly;
   e. connecting a first wireline from the first winch to the substructure and connecting a second wireline from the second winch to the substructure through the sheave block;
   f. activating the second winch to pull the substructure along the rollers and disconnecting the second wireline once the substructure contacts the site;
   g. unsecuring the dolly and moving the truck and the dolly in an opposite direction, wherein the substructure moves on the rollers and onto the site; and
   h. disconnecting the first wireline.

2. The method of claim 1, further comprising the steps of placing a second substructure parallel to the substructure.

3. The method of claim 2, further comprising the steps of
   a. moving a second truck carrying a mast into position;
   b. connecting the mast to the substructures; and
   c. disconnecting the truck from the dolly and disconnecting the mast from the dolly.

4. The method of claim 3, further comprising the step of extending a mast stand from the mast to the site in order to support the weight of the mast until the mast is raised.

5. The method of claim 1, further comprising the steps of
   a. resting the substructure during transport on a dolly bolster attached to the dolly; and
   b. lowering the dolly bolster until the substructure is on the rollers.

6. The method of claim 1, wherein the step of connecting the gooseneck to the dolly stabilizes the dolly and prevents the dolly from tipping.

7. The method of claim 1, wherein the first winch controls direction and inertia of the substructure.

8. The method of claim 1, wherein the second winch pulls the substructure along the rollers until the center of gravity of the substructure is located beyond the dolly.

9. The method of claim 1, wherein the step of activating the second winch to pull the substructure comprises releasing the first wireline from the first winch as the substructure moves on the rollers, wherein the first wireline maintains tension.

10. The method of claim 1, wherein the dolly is a self-steering dolly comprising at least six sets of wheels and a dolly bolster located centrally on the dolly.

11. A method of unloading a drilling rig substructure at a drilling site, wherein the method comprises the steps:
   a. transporting the drilling rig substructure to the drilling site using a first truck with a dolly and a second truck, wherein the first truck comprises a winch, and a gooseneck connected to the substructure, and wherein the dolly comprises a plurality of rollers and a sheave block;
   b. lowering the substructure onto the rollers;
   c. securing the dolly and moving the first truck towards the dolly to push the substructure along the rollers;
   d. disconnecting the gooseneck from the substructure and connecting the gooseneck to the dolly;
   e. connecting a first wireline from the winch to the substructure connecting a second wireline from the second truck to the substructure;
   f. moving the second truck to pull the substructure along the rollers and disconnecting the second wireline once the substructure contacts the site;
   g. unsecuring the dolly and moving the first truck and the dolly in an opposite direction, thereby unloading the substructure onto the site; and
   h. disconnecting the first wireline.

12. The method of claim 11, further comprising the steps of placing a second substructure parallel to the substructure.

13. The method of claim 12, further comprising the steps of
   a. moving a third truck carrying a mast into position;
   b. connecting the mast to the substructures; and
   c. disconnecting the truck from the dolly and disconnecting the mast from the dolly.

14. The method of claim 13, further comprising the step of extending a mast stand from the mast to the site in order to support the weight of the mast until the mast is raised.

15. The method of claim 11, further comprising the steps of
   resting the substructure during transport on a dolly bolster attached to the dolly; and
   lowering the dolly bolster until the substructure is on the rollers.

16. The method of claim 11, wherein the step of connecting the gooseneck to the dolly stabilizes the dolly and prevents the dolly from tipping.

17. The method of claim 11, wherein the first winch controls direction and inertia of the substructure.

18. The method of claim 11, wherein the second truck pulls the substructure along the rollers until the center of gravity of the substructure is located beyond the dolly.

19. The method of claim 11, wherein the step of ac moving the second truck to pull the substructure along the rollers comprises releasing the first wireline from the winch as the substructure moves on the rollers, wherein the first wireline maintains tension.

20. The method of claim 11, wherein the dolly is a self-steering dolly comprising at least six sets of wheels and a dolly bolster located centrally on the dolly.

21. A method of loading a drilling rig substructure from a drilling site, wherein the method comprises the steps:
   a. positioning a truck with a dolly linearly in relation to the substructure, wherein the dolly is connected to the truck by a gooseneck, wherein the truck comprises a winch, and wherein the dolly comprises a plurality of rollers and a sheave block;
   b. securing the dolly in place and connecting a wireline from the winch to the substructure;
   c. activating the winch until the center of gravity of the substructure is located above the dolly, wherein gravity places the substructure on the dolly;
   d. continuing to use the winch to pull the substructure along the roller until the substructure reaches the gooseneck;
   e. disconnecting the gooseneck from the dolly and connecting the gooseneck to the substructure;
   f. moving the truck to pull the substructure along the rollers into a final position on the dolly; and g. connecting the substructure to the dolly and unsecuring the dolly.

22. The method of claim 21, further comprising the steps of
a. resting the substructure on a dolly bolster attached to the dolly;
b. lowering the dolly bolster into a second position for transport.

23. The method of claim 21, wherein the winch further controls direction and inertia of the substructure.

24. The method of claim 21, wherein the dolly is a self-steering dolly comprising at least six sets of wheels and a dolly bolster located centrally on the dolly.

* * * * *